Patented Aug. 14, 1923.

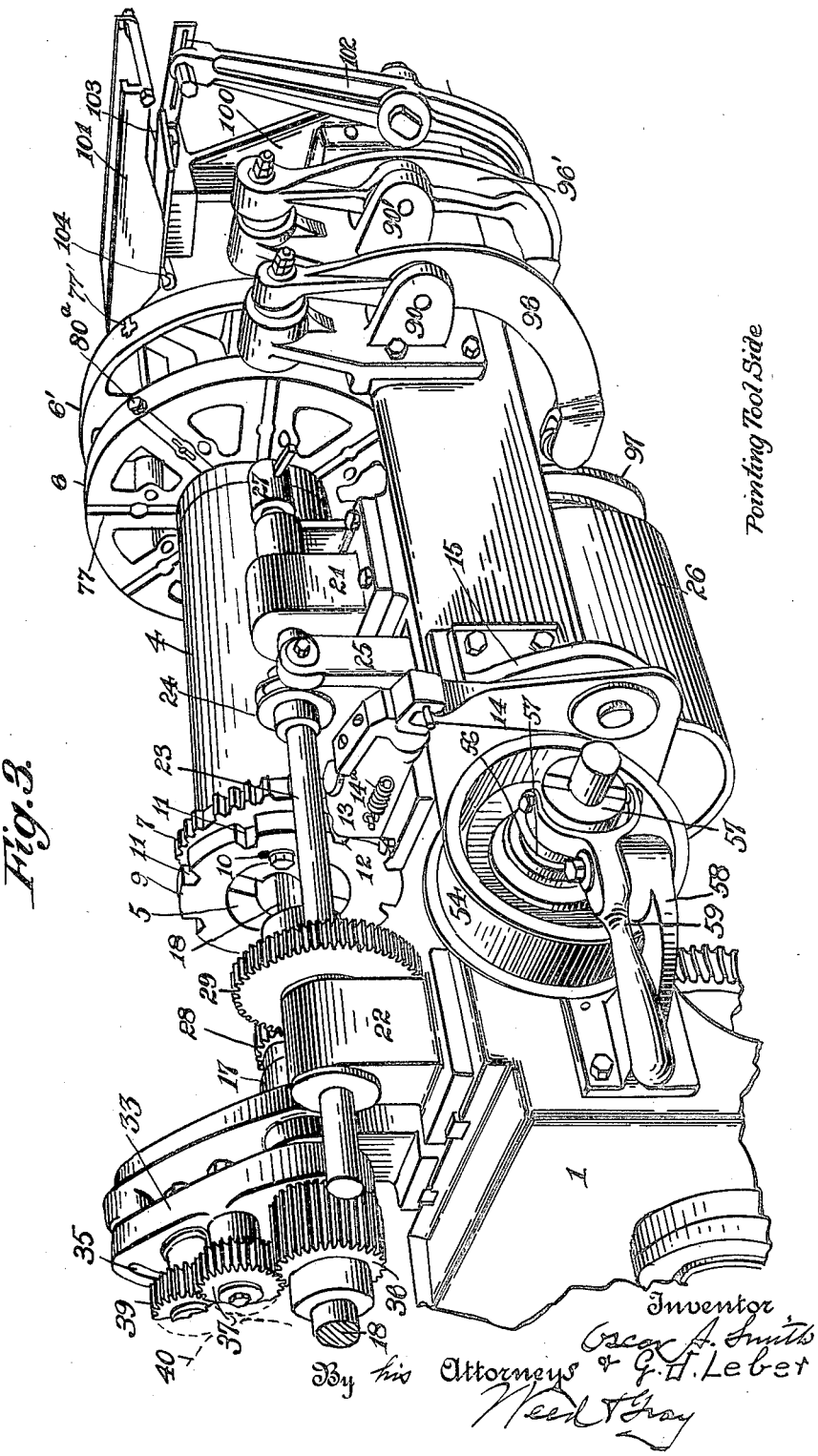

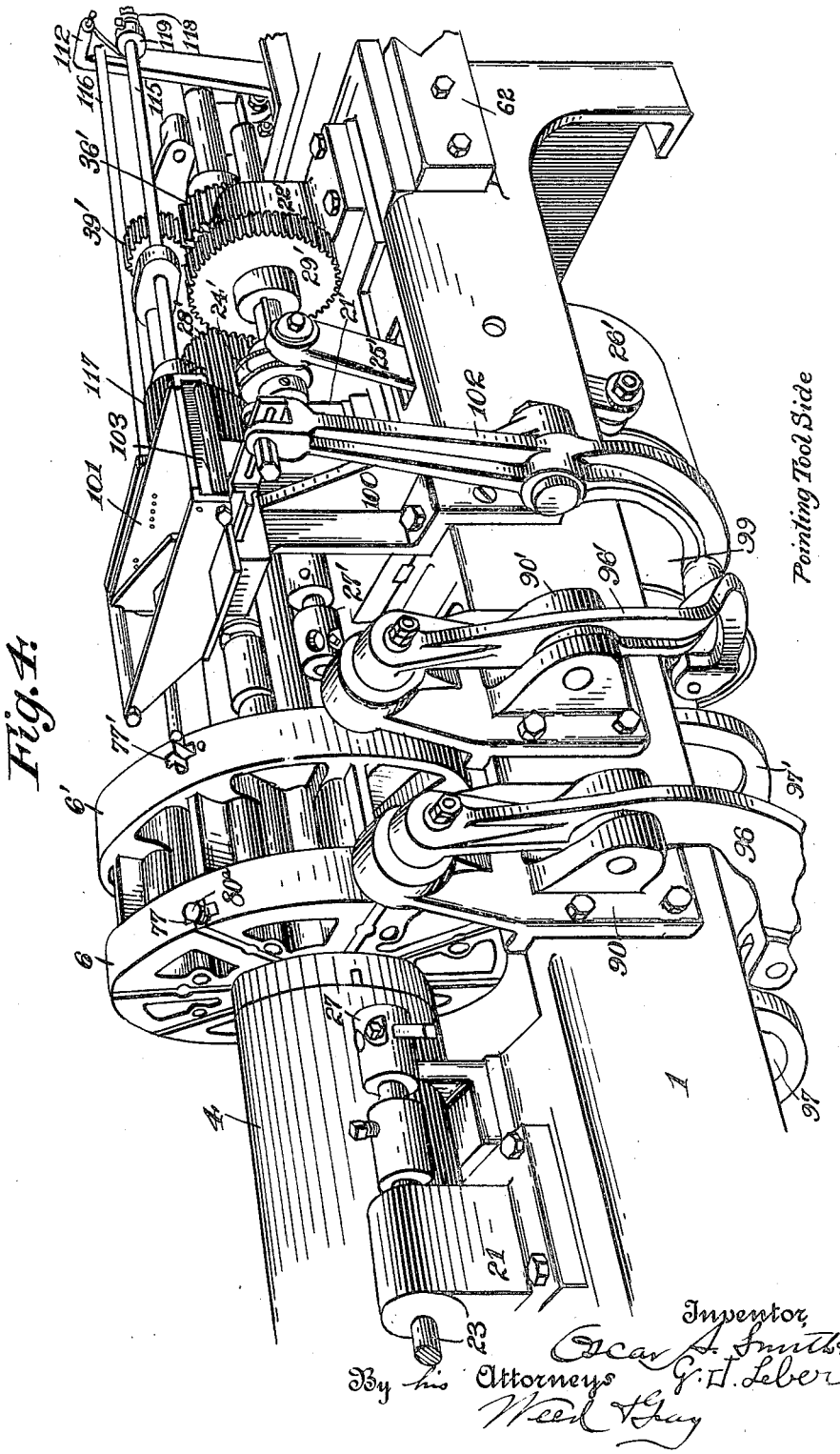

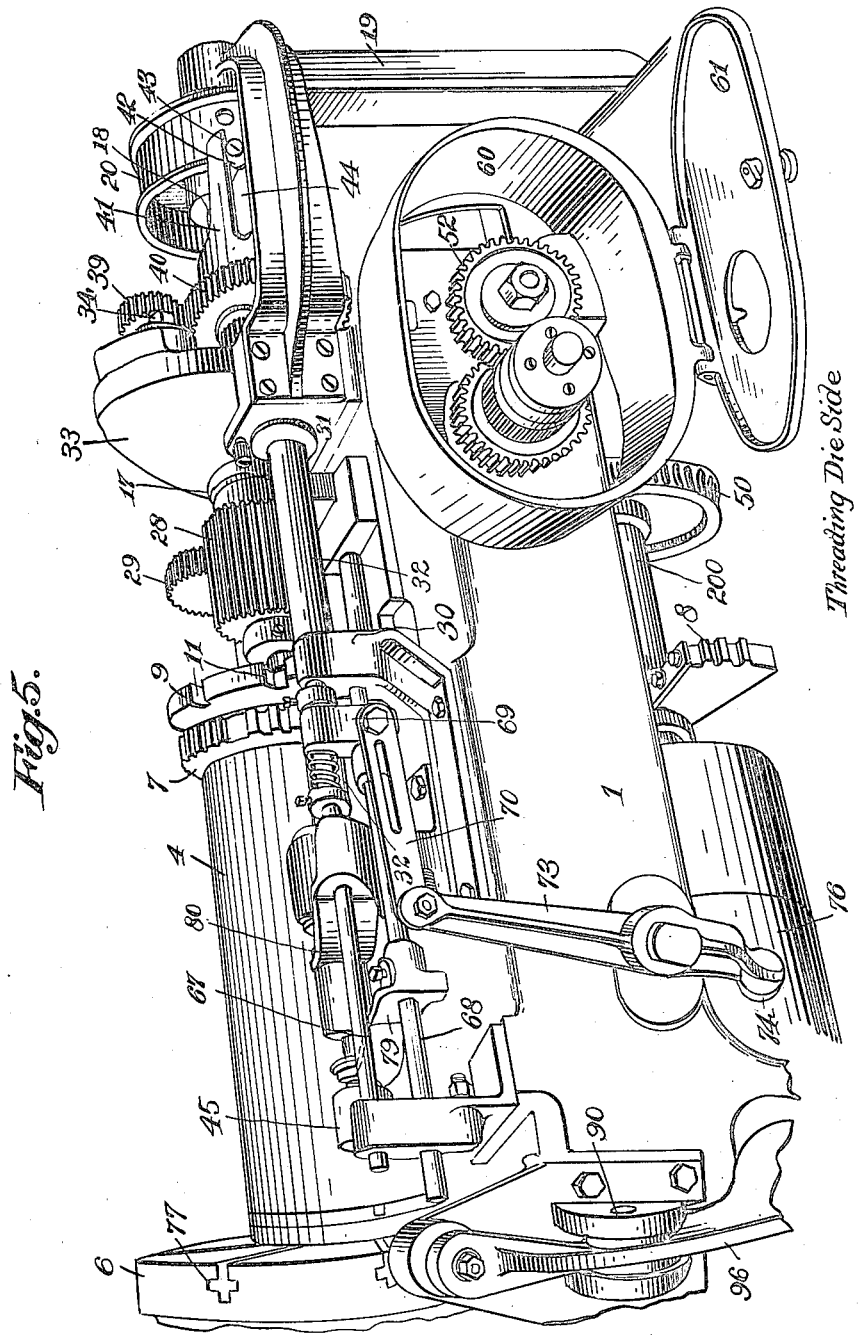

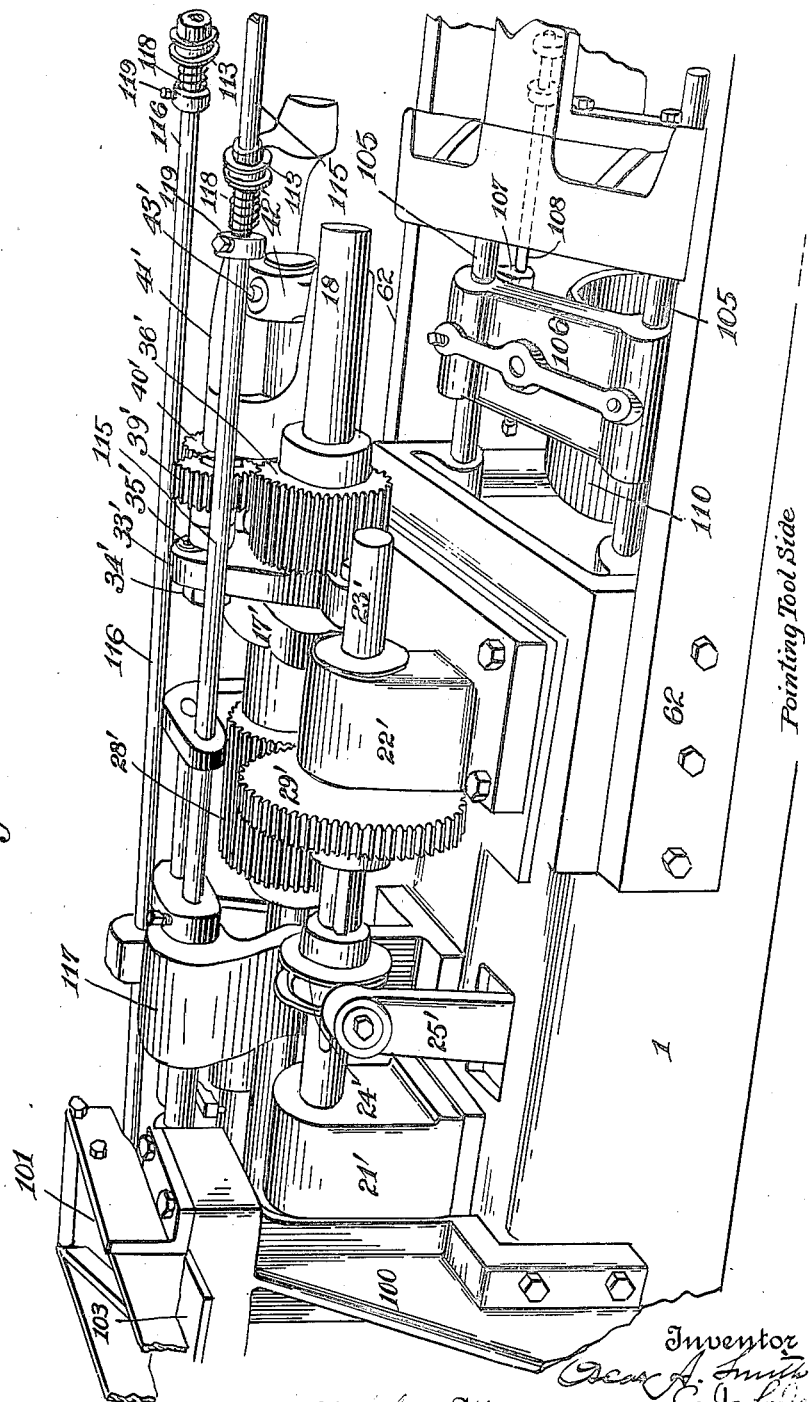

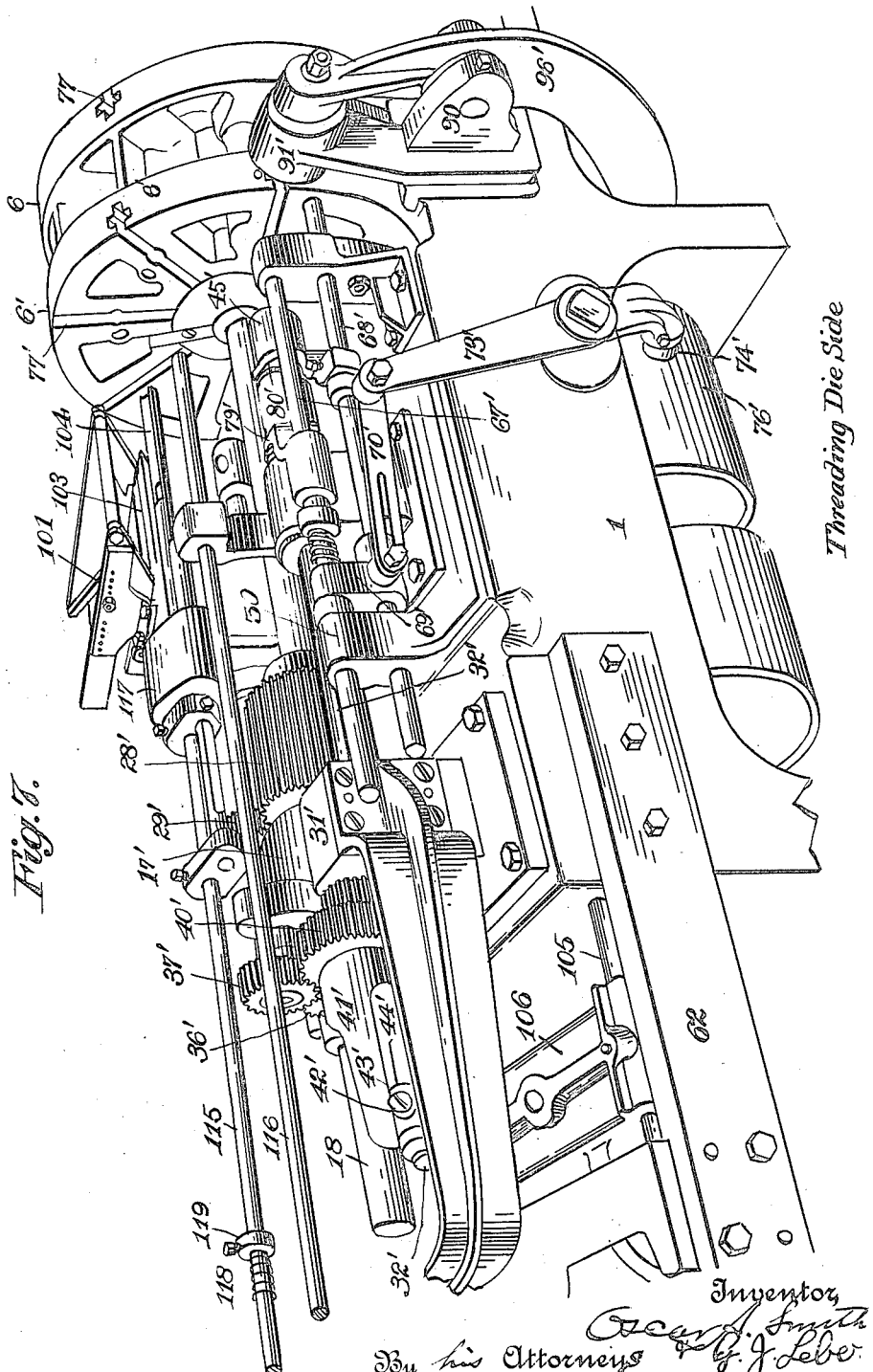

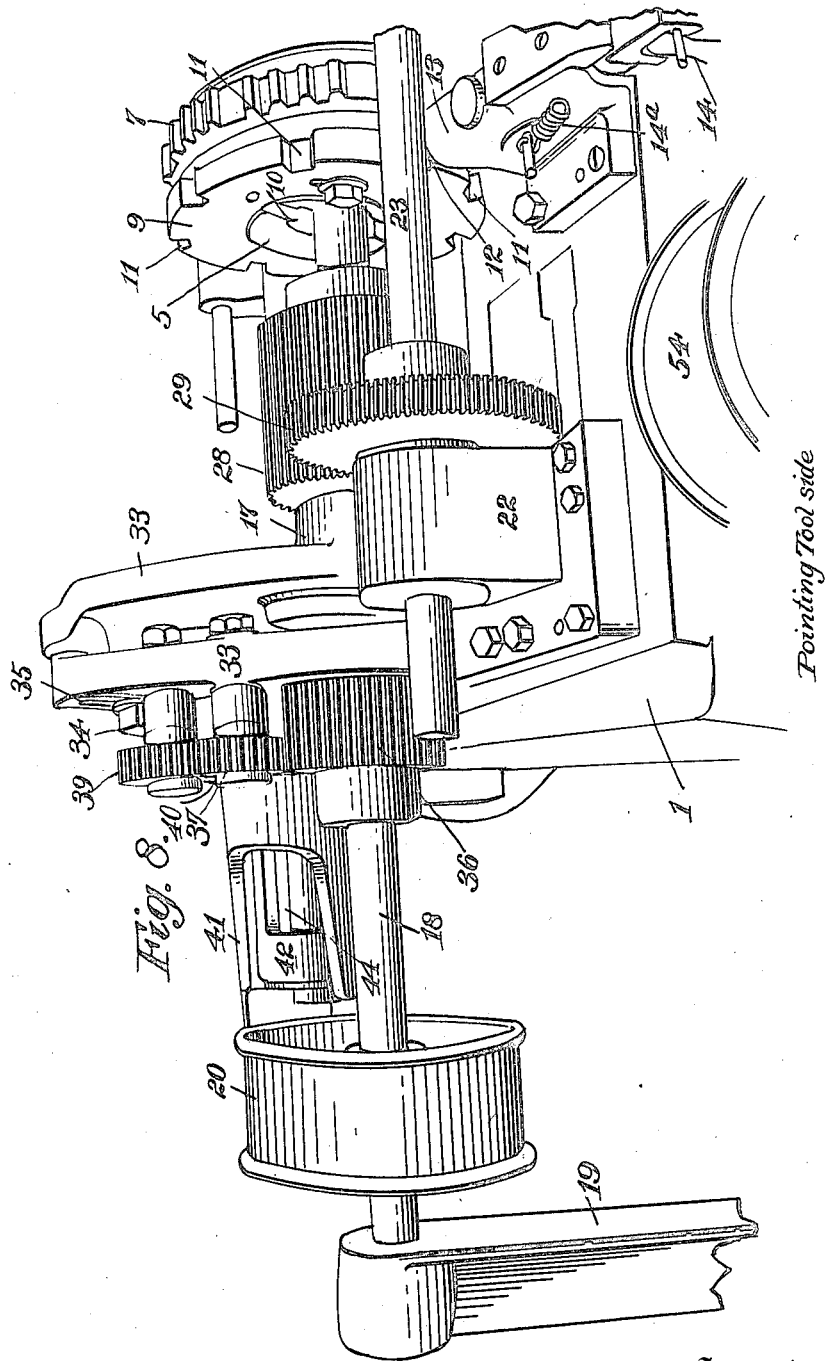

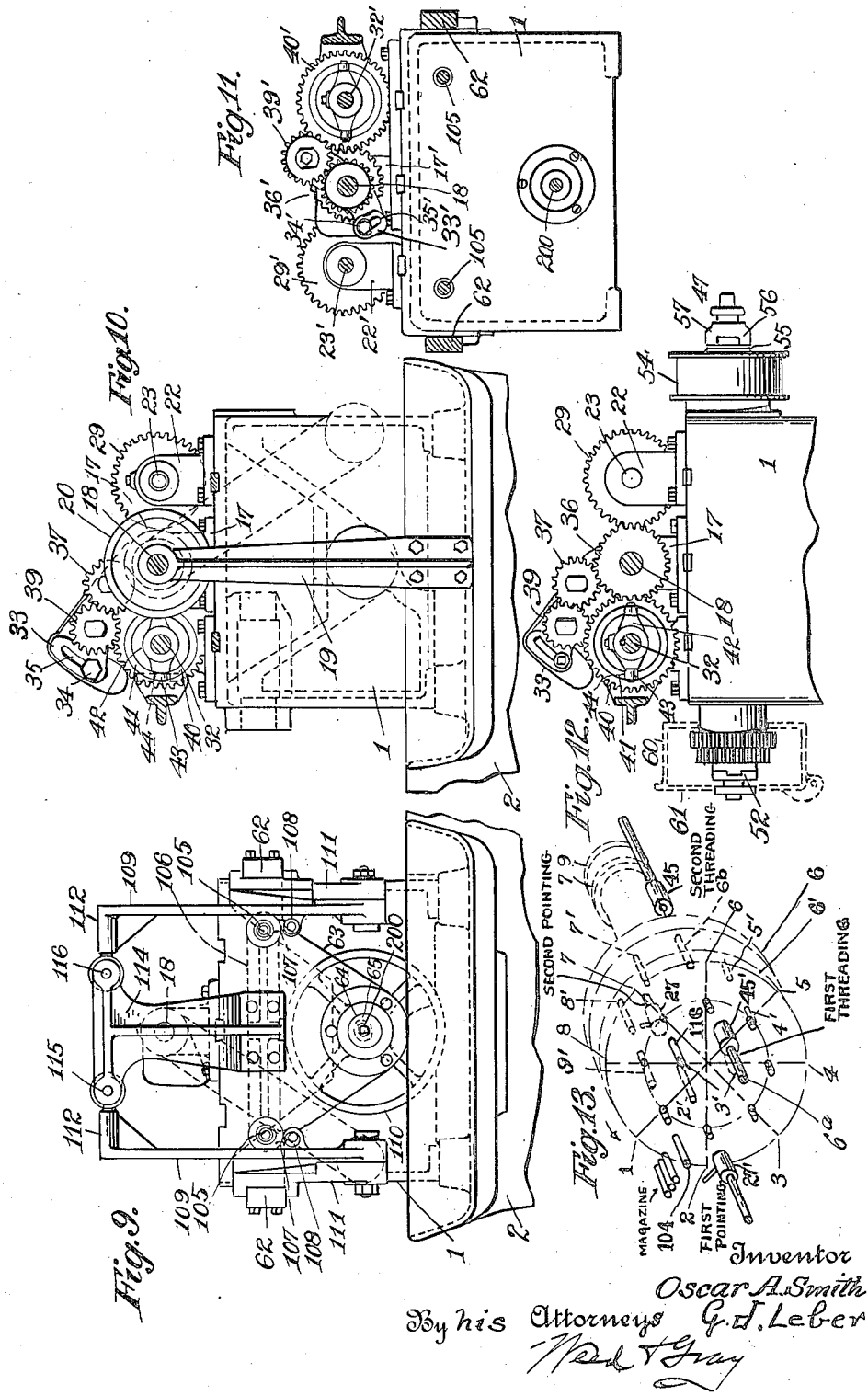

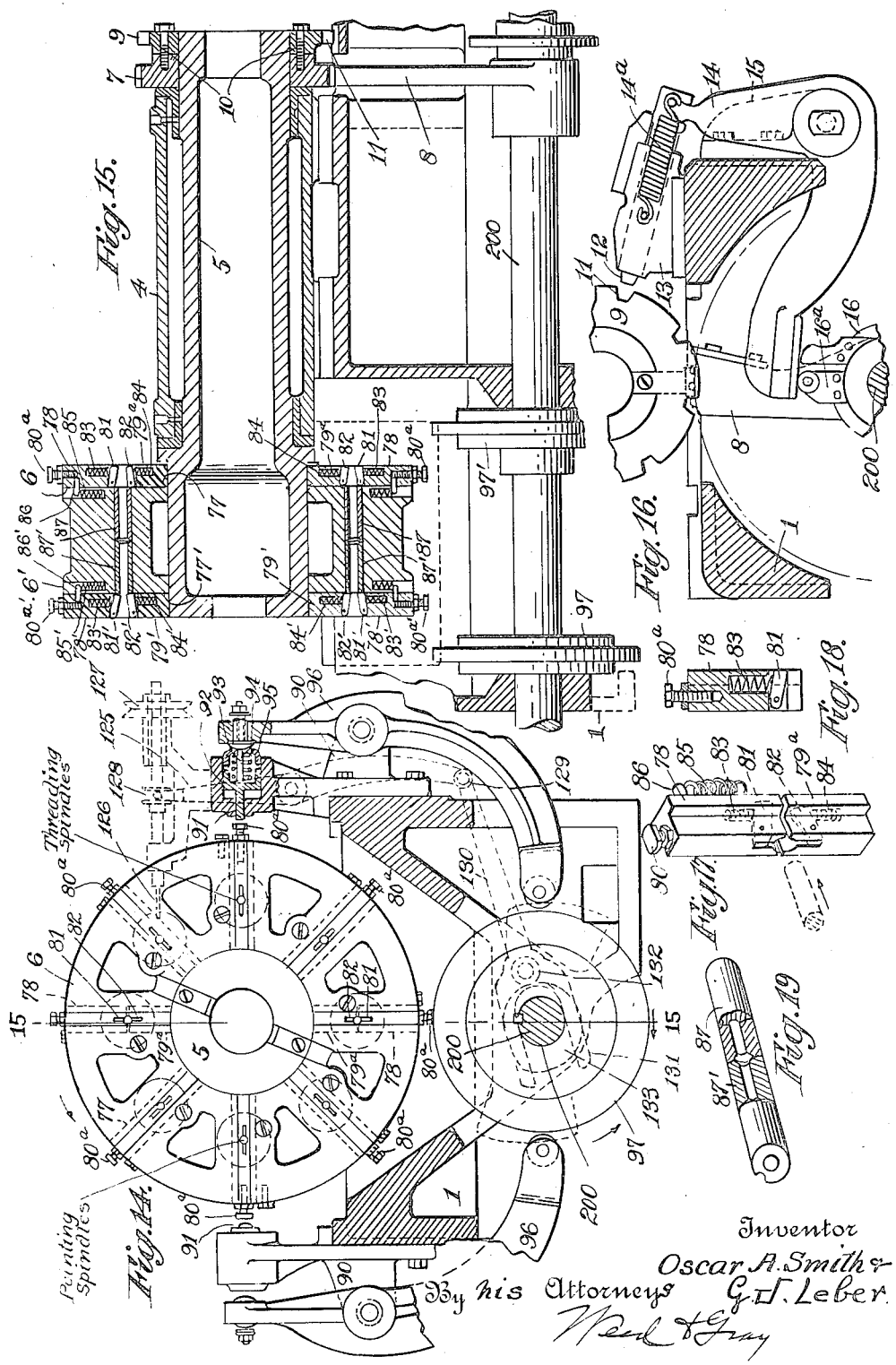

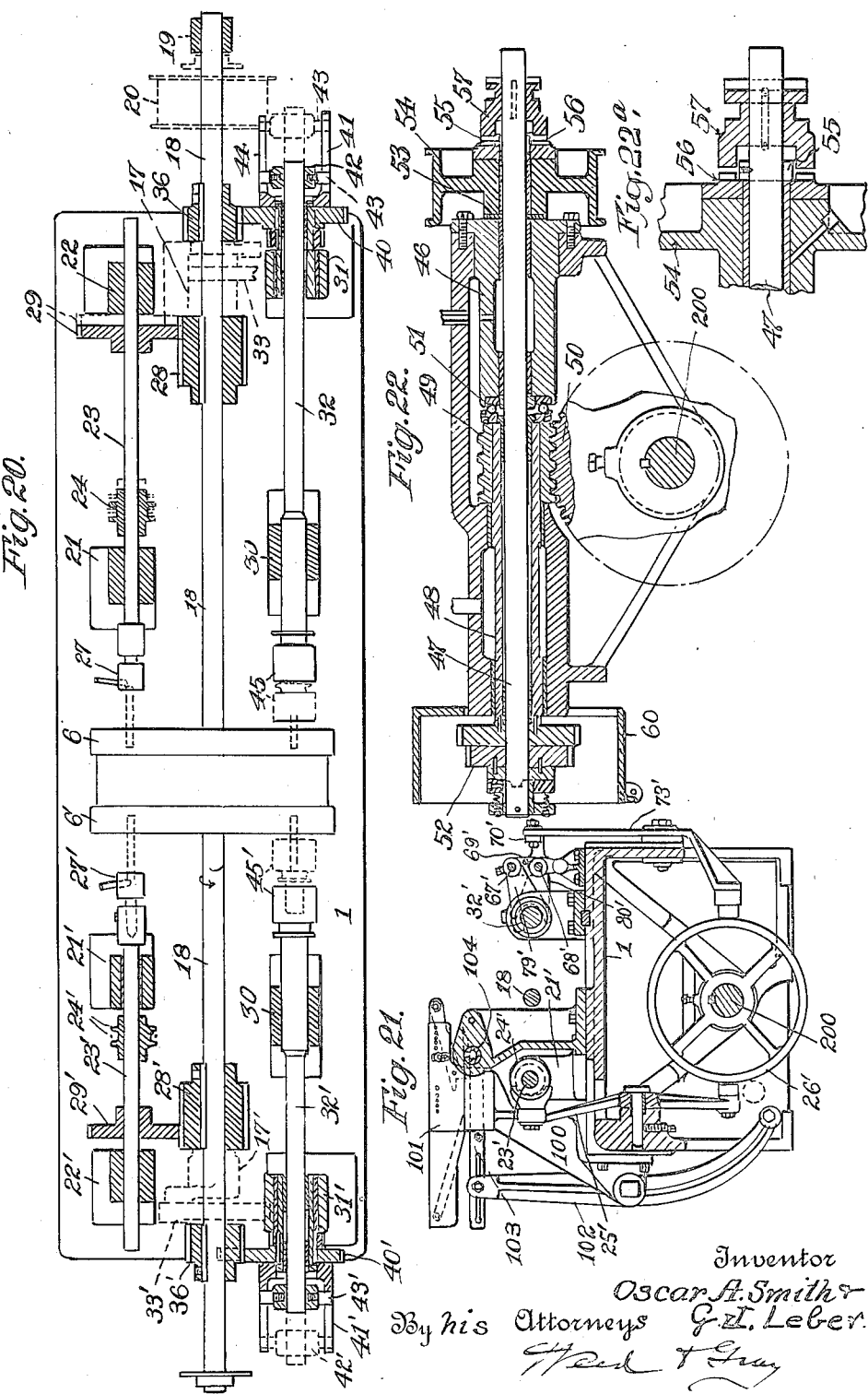

1,464,956

UNITED STATES PATENT OFFICE.

OSCAR A. SMITH, OF EAST CLEVELAND, AND GEORGE J. LEBER, OF CLEVELAND, OHIO, ASSIGNORS TO THE NATIONAL ACME COMPANY, OF CLEVELAND, OHIO, A CORPORATION OF OHIO.

DUPLEX STUD-FORMING MACHINE.

Application filed February 1, 1921. Serial No. 441,545.

*To all whom it may concern:*

Be it known that we, OSCAR A. SMITH and GEORGE J. LEBER, both citizens of the United States, said Smith residing at East Cleveland, and said Leber at Cleveland, in the county of Cuyahoga and State of Ohio, have invented certain new and useful Improvements in Duplex Stud-Forming Machines, of which the following is a specification.

This invention relates to metal working machines, the object thereof being to provide a duplex metal working machine comprising a pair of duplicate rotary blank carriers and opposed duplicate sets of endwise working tools, between which opposed sets of tools the blank carriers are supported for intermittent rotation, each set of tools cooperating with a carrier.

In the present instance, the duplicate sets of end working tools are shown as stud pointing and threading tools, although slotting and milling tools or other forms of tools may be used if desired, and therefore although the machine is shown and described, because of the particular tools illustrated. as an automatic stud pointing and threading machine, it is to be understood that work other than pointing and threading the blanks could be performed by merely changing the tools carried by the tool spindles and without in any way modifying or changing the construction and operation of the several mechanisms.

One of the objects of the invention is the provision of a machine of this kind in which several blanks, four in the present instance, can all be operated upon simultaneously, duplicate operations being performed upon the blanks during each indexing of the blank carriers and in substantially the same time that it has heretofore taken to perform one operation of a similar kind, thus very materially increasing the output of the work, and consequently lessening the cost thereof, since obviously this machine in the care of one operator can do the work of two independent machines, each requiring its own operator.

Figure 1:
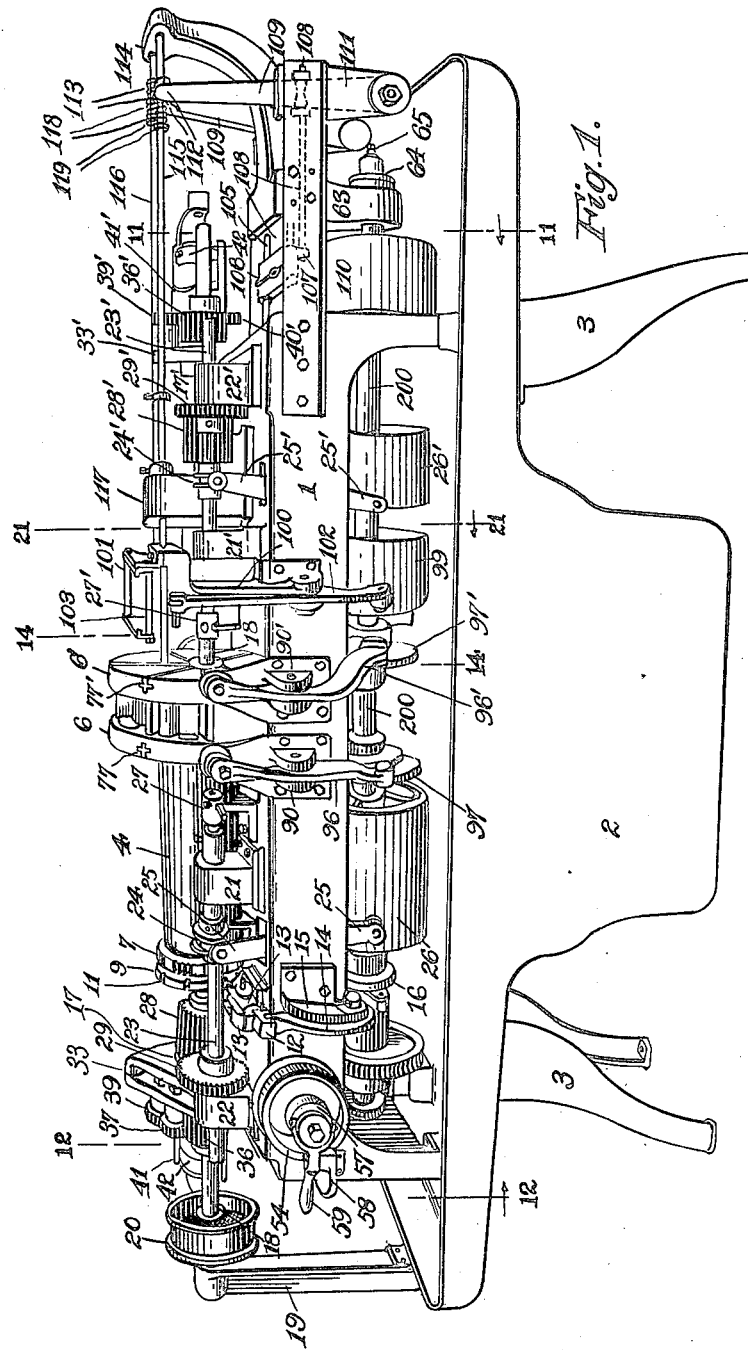
Figure 2:
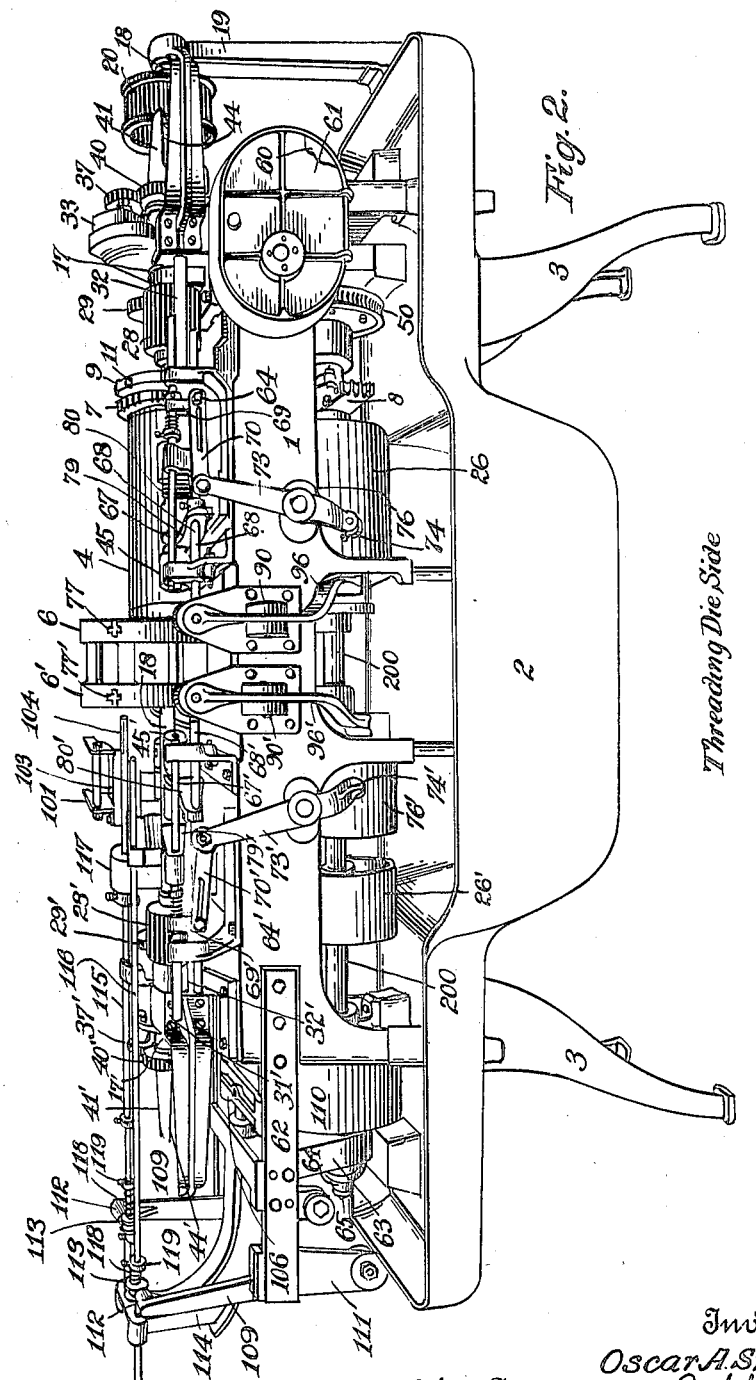

In the drawings accompanying and forming a part of this specification, Fig. 1 is a perspective view illustrating one side of this improved machine, or that side which may be designated as the pointing spindle side; Fig. 2 is a side view illustrating the opposite side of the machine, or that side which may be designated as the threading die side; Fig. 3 is a perspective view of the same side of the machine shown in Fig. 1, but illustrating certain of the mechanisms thereof on an enlarged scale at the left hand half of Fig. 1; Fig. 4 is a perspective view of the same side of the machine shown in Fig. 1, but illustrating the mechanisms on an enlarged scale, at the center of the machine; Fig. 5 is a perspective view of that side of the machine shown in Fig. 2, but illustrating on an enlarged scale certain of the mechanisms thereof at the right hand half of said Fig. 2; Fig. 6 is a perspective side view illustrating on an enlarged scale certain of the mechanisms shown at the right hand half of Fig. 1; Fig. 7 is a perspective view illustrating on an enlarged scale certain of the mechanisms shown at the left hand half of Fig. 2; Fig. 8 is a perspective view illustrating on an enlarged scale a part of the driving mechanisms for the turrets and the end working tools shown at the left hand end of Fig. 1; Fig. 9 is a right hand end view of the machine illustrated in Fig. 1; Fig. 10 is a left hand end view of the machine illustrated in Fig. 1; Fig. 11 is a cross sectional view taken on line 11—11 Fig. 1; Fig. 12 is a cross sectional view taken on line 12—12 Fig. 1; Fig. 13 is a perspective, diagrammatic view illustrating the direction in which the turret is indexed and the operation of the tools upon the blanks carried thereby; Fig. 14 is a cross sectional view taken on line 14—14 of Fig. 1; Fig. 15 is a vertical sectional view taken on line 15—15 of Fig. 14; Fig. 16 is a detail sectional view of the turret locking mechanism; Fig. 17 is a detail perspective view of one set of gripping blocks; Fig. 18 is a detail sectional view of one of said blocks; Fig. 19 is a perspective detail, partly sectional view, of one of the bushings for the turret; Fig. 20 is a sectional plan view of the layout of the blank carriers and duplicate sets of endwise working tools; Fig. 21 is a cross sectional view taken on line 21—21 of Fig. 1; Fig. 22 is a longitudinal sectional view of the worm shaft mechanism for operating the worm wheel and its cam shaft; and Fig. 22ª is an enlarged detail section illustrating more clearly the clutch mechanism.

Similar characters of reference indicate corresponding parts in the different figures of the drawings, but as the mechanisms at each side or face of the duplex blank carrier are in many instances duplicates of each other, the reference characters at one side of the turret will be used for the duplicated parts at the opposite side of the turret with the addition of prime marks. Therefore a description of the mechanisms at one end applies to the duplicate mechanisms at the opposite end and which are herein designated with the same reference characters with the addition of the prime marks.

In the present improvement, the rotary blank carriers are shown supported substantially centrally of the length of what may be termed the main driving shaft, and this pair of blank carriers or disks are shown rigidly connected together by webs, thus forming a duplex blank carrier or turret.

The driving mechanism for the cam shaft, by means of which the turret is indexed and by means of which certain of the mechanisms are actuated, and the driving mechanism for the main driving shaft and from which the tool spindles are driven, is in the present instance shown at the left hand end of the machine illustrated in Fig. 1.

Of course it will be understood that electrically driven means, such as motors, could be used for driving the several mechanisms, but in the present improvement the main driving shaft is driven from one belt pulley while the cam shaft actuating means is driven from another belt pulley.

The present improved duplex metal working machine comprises in a general way a rotary duplex turret including a pair of blank carriers, means for indexing it intermittently, means for locking the turret in its indexed position, duplicate sets of opposed tool spindles located at opposite sides or faces of the turret and shiftable toward and from the turret, means for feeding blanks to one of the blank carriers, means for pushing the blanks from the blank carrier into its companion blank carrier, and gripping means for gripping the blanks in the blank carriers. Thus, starting with the feeding of the first blank (see Figs. 13 and 14), the blank will be fed from a suitable magazine to one blank carrier, thence carried on the indexing of the turret into position to be worked upon as, for instance pointed, whereupon it is carried as the turret is again indexed, to the opposite side of the machine through several, as three, idle stations and into position to be threaded, thence on the indexing of the turret it is carried into position to be pushed from the first carrier into the second carrier, whereupon as the turret is again indexed it is carried through several idle stations, as two, into position to have its opposite end pointed, and thence on the indexing of the turret the blank is carried again back to the opposite side of the machine through several idle stations, as three, into position to be threaded and then on the next indexing of the turret it is carried into position to be pushed out of or ejected from the second carrier by the feeding of a new blank from the first carrier into the second carrier, it requiring in the present instance fourteen indices of the turret after the blank is fed thereinto to fully complete a work blank that is pointed and threaded at both ends, but as a work blank is fed into the turret from the magazine at each indexing of the turret it follows that after the carriers have been completely loaded, a completely formed blank pointed and threaded at both ends will be discharged from the turret at each indexing thereof.

In the present improved machine organized as shown herein, it will be observed that the two pointing tool spindles are located at the same side of the machine, as for instance, the front side in Fig. 1, one at each side of the turret, so that they are opposed to each other, while the two threading die spindles are located at the opposite side of the machine, one likewise at each side of the turret while they likewise are opposed to each other. Consequently in the present organization, after a blank has been pointed, say in blank carrier 6', it passes through several idle stations, as three, to the opposite side of the same carrier 6' and diametrically opposite the pointing tool, where it is then threaded. At the next indexing of the carrier, it passes from carrier 6' to carrier 6 and then carried through two idle stations into position to be pointed at the opposite end, and then again to the opposite side of carrier 6 to have its opposite end threaded, subsequent to which it is ejected as before explained. Thus both pointing tools are in alinement with each other at the same side of the machine, and are shifted simultaneously toward and from the turret, and the two threading dies are likewise in alinement and are shifted simultaneously toward and from the turret, so that when the blank carriers are completely loaded, two blanks are being pointed and two blanks are being threaded all at the same time.

In the preferred form thereof herein shown and described, this improved machine, as organized for pointing and threading studs, comprises a suitable pan 2, having legs 3, and to the top of which pan is bolted a bed 1. Suitably tongued and bolted to the top of this bed 1 is a bearing 4 for the reception of the stock gripping disk or blank carrier shaft 5 (see Fig. 15), which shaft 5 is a hollow shaft, and to one end of this shaft are secured the blank carriers or stock disks 6 and 6', each having in the present instance eight gripping means or stations for the reception of the blanks to be worked upon, so that the two blank carriers are adapted to carry, when fully loaded, sixteen blanks. These blank carriers 6 and 6' are suitably connected by webs or ribs, thus forming what may be designated as a duplex turret or blank carrier.

To the opposite end of the shaft 5, which is mounted in the bearing 4, and having a bearing against the end of this bearing 4, there is secured in a suitable manner indexing gear 7, which gear is intermittently engaged by a fan gear 8 (see Figs. 2 and 5) carried on the cam shaft 200, and by means of which fan gear the duplex turret is intermittently rotated or indexed, the indexing gear 7 having, in the present instance, eight series or sets of spaced teeth, with each several sets of which the fan gear engages during the rotations of the cam shaft. Loosely fitted on the end of the shaft 5 and adjustably bolted to the indexing gear 7 by means of a pair of bolts and elongated slots, is indexing plate 9, the elongated slots 10 permitting circular adjustment of this indexing plate. This plate is provided with eight notches or recesses 11 corresponding with the number of sets of gear teeth of the indexing gear 7. Cooperating with these notches is a suitable locking mechanism comprising a shiftable locking bolt 12 located in a bolt bearing 13 secured to the bed of the machine. The inner end of the bolt is machined to properly engage the notches or recesses 11 of the index plate 9. The outer end of this lock bolt is provided with a slot for the reception of the upper end of a lever 14 (see Figs. 3 and 16) pivoted to a bracket 15 bolted to the side of the bed 1.

The opposite end of the lever 14 is actuated by a suitable cam or cam disk 16 secured to the cam shaft 200 and carrying suitable dogs 16ª in the well known manner of a National Acme automatic screw machine, and the engagement of this lever with the cam dogs is maintained by means of a spring 14ª secured to the bolt bearing 13 and to a pin on the upper end of the lever 14, thereby to lock the duplex turret or blank carrier each time it is indexed.

Adjacent to the ends of the bed and in line with the hollow shaft 5, there are bolted main drive shaft bearings 17 and 17'. Housed in these bearings 17 and 17' and having a bearing in each end of the hollow shaft 5 (see Fig. 15) is main drive shaft 18. Thus, this shaft extends from end to end of the machine and the duplex turret is shown located centrally between the ends thereof. One end of this shaft is supported by a bracket 19 bolted to the end of the pan 2 and mounted on the shaft 18 is main driving pulley 20. Secured to the bed at each side of the duplex turret are two bearings 21 and 22, and in these bearings 21 and 22 is located a tool spindle 23 herein designated as the pointing tool spindle. Secured to the pointing tool spindle 23 is a spool or grooved member 24, and projecting through recesses in the bed and pivoted to the bed is a pointing spindle lever 25 and to the upper end of this lever 25 is a bronze dog, which enters the grooved portion of the spool, and to the lower end of the lever is a stud roller in position to come in contact with suitable cams mounted on the cam drum 26 fastened to the cam shaft 200, and by this means the two tool spindles 23 and 23' are shifted toward and from the duplex turret. In the present instance these tool spindles 23 and 23' are shown as carrying a pointing tool or pointing box 27 for pointing the studs, the two pointing tools 27 and 27' being located in alinement and opposed to each other, one at each side or side face of the duplex turret, and by the means just described on the rotation of the cam shaft the two pointing spindles are shifted toward and from the blanks in the duplex turret, so that when the turret is properly loaded, these two pointing spindles will be operating on two independent blanks to point them both at the same time. For rotating the pointing spindles, the main driving shaft 18 has keyed thereto a relatively long spur gear 28, and mounted on the pointing spindle 23 between the bearings 21 and 22 in position to mesh with the gear 28 is a traveling spur gear 29, that is to say, this gear moves with the pointing spindle, which is permitted by the length of the spur gear 28. Consequently as the main shaft is rotated by the pulley 20, the pointing spindle shafts are rotated through the gears 28 and 29 and gears 28' and 29'.

On the opposite side of the bed, and therefore at the opposite side of the shaft 5, and its bearing 4, and suitably bolted to the bed, are die spindle bearings 30 and 31, and housed in these bearings parallel with the main driving shaft 18 and with the pointing spindle shaft 23 is a die spindle shaft 32. The mechanism for rotating these die spindle shafts is in duplicate like that for rotating the pointing spindle shafts, and comprises a rocker arm 33 (see Figs. 8 and 6), which is mounted on the main driving shaft 18 by means of a suitable bore, and is adjustably clamped to the face of an extended portion of the bearing 17 by a suitable bolt 34 extending through an arcuate slot 35. Fastened to the main driving shaft 18 by a suitable key and set screw is a spur gear 36, and this spur gear is in mesh with an intermediate spur gear 37 carried by a stud secured to the rocker arm 33. The spur gear 37 is in mesh with another intermediate spur gear 39 likewise carried by a stud secured to the rocker arm 33, and this last spur gear meshes with a spur gear 40 loosely mounted on the die spindle 32, and this gear 40 is maintained in its proper place on the die spindle 32 by some suitable means not herein shown. This gear 40 is provided with a slotted driving sleeve 41. To the rear end of the die spindle 32 is fastened a dog 42, which is located within the end of the sleeve 41, in other words it telescopes therein. To the periphery of this dog 42 is fastened a pair of stud rollers 43 projecting into the slots of the sleeve 41 of the gear 40, whereby on the rotation of the gear 40 from the main driving shaft through the medium of the gears 36, 37 and 39, the slotted sleeve 41 and the said gear 40 will be rotated thereby to rotate the die spindle while at the same time the reciprocating movement of the die spindle back and forth is permitted relatively to its gear 40 and sleeve 41 by reason of the slots 44. Thus, by means of this gear mechanism just described the die spindle is rotated from the main driving shaft 18, while at the same time the die spindle is permitted to be shifted toward and from the duplex turret in a manner which will be readily understood. The rocking arm 33 and its arcuate slot 35 permits the swinging adjustment of this arm 33 on the shaft 18 thereby to substitute different gears, and consequently a change in the speed of the die spindle.

The bearing 17' and rocker arm 33' at the opposite end of the machine are slightly different in shape than the bearing 17 and rocker arm 33, and there is one less intermediate gear used in the train of gears 36', 39' and 40' from the main shaft to the die spindle shaft, but otherwise the construction is the same. The reason for this difference in the number of gears is that both die spindles are rotated from the main driving shaft 18, which always rotates in the same direction, but as it is necessary to rotate one die spindle in one direction and the other in the opposite direction, therefore one less intermediate gear is necessary to accomplish this result.

From the foregoing it will thus be seen that both pointing spindles 23 and 23' and both die spindles 32 and 32' are rotated from the main driving shaft 18 by the gearing hereinbefore described, while both pointing spindles are reciprocated toward and from the duplex turret, as is also the case with the two die spindles, this being permitted by the slotted sleeves 41 and 41' hereinbefore described. Carried at the inner end of each die spindle is what is known as a self-opening National Acme die 45. Suitable mechanism is provided for shifting the die spindles 32—32' toward and from the turret, and for opening and closing the dies at the proper time to permit the same to properly thread the blanks. This mechanism for reciprocating the die spindles and operating the dies it is not deemed necessary to show and explain in detail herein, since it is fully shown and described in Patent No. 1,315,427 dated September 9, 1919 issued to Oscar A. Smith and Benjamin B. Rindfleisch, assignors to The National Acme Company, the assignee of the present invention, and therefore it is merely necessary to say herein that a part of this operating mechanism for the die spindles comprises the arms 79 and 80 carried by the sliding rods 67 and 68 connected by a dog 69, to which is pivoted a link 70, to which is pivoted the upper end of die spindle operating lever 73 pivoted to the side of the bed 1, and to the lower end of which lever 73 is secured a stud and roller 74 in position to be engaged by suitable cams at the proper time on the cam drums 76 carried by the cam shaft 200. (The set of reference characters to describe these parts are duplicates of those used in connection with the description of said Patent No. 1,315,427, to which patent reference is made for a more complete description of the construction and manner of operation of the self opening threading dies).

Briefly, the operation of this mechanism is such that the die spindles will be shifted toward the turret, the dies are then closed or set, and as the die spindles and the dies are rotated, the work will be threaded. Thereafter the dies are opened to release the work and the dies and the spindles shifted away from the turrets in a manner which will be readily understood by reference to said patent, wherein there is a full and complete description commencing with page 4, line 74 of this entire mechanism.

For driving the cam shaft 200, there is housed in suitable bearings of the bed 1 between the main driving shaft 18 and the cam shaft 200, and at right angles to these shafts, a worm shaft mechanism (see Fig. 22). This worm shaft mechanism comprises a hollow worm shaft sleeve or bracket 46, which acts as a bearing for one portion of the worm shaft 47. The sleeve bracket 46 is provided with a flanged portion or end, by which means it is bolted to the bed 1, which is suitably bored for this purpose. A sleeve 48 having a bearing in the bore of the bed 1, forms a bearing for the other end of the worm shaft 47. To the inner end of this sleeve 48 is keyed a worm 49 in position to mesh with a worm wheel 50 fastened to the cam shaft 200. A ball thrust 51 is housed between the inner end of the bracket sleeve 46 and the inner end of the sleeve 48. To the outer end of sleeve 48 and the worm shaft 47 are secured suitable change gears 52 with safety tripping mechanism, such as is used on the well known National Acme machines, and therefore a detailed description thereof is not deemed necessary herein, except to say that this system of change gears provides for variations in the speed of the worm shaft 47, as occasion may require. Loosely mounted on the other end of the worm shaft 47 and resting against the bracket sleeve 46 is a thrust washer 53. Loosely mounted on the worm shaft 47 and resting against the face of this washer 53 is a worm shaft driving pulley 54. This pulley is held against lateral movement by a collar 55 fastened to the worm shaft 47. The outer face of pulley 54 is provided with a clutch member 56. To this end of the worm shaft 47 is keyed for sliding movement a cooperating clutch member 57, this member being held however, for rotary movement with the shaft.

Bolted to the side of the bed is a bracket 58 (see Fig. 3) and to this bracket is pivoted a control lever 59, which is provided with a pair of shoes fitting in a groove of the clutch member 57. By means of this control lever 59 the clutch members may be connected and disconnected, thereby to connect and disconnect the worm shaft 47 with the driving pulley 54. Thus, by means of the driving pulley 54 the clutch members 56 and 57, the worm shaft 47, the change gears 52, the worm 49, and worm wheel 50, the cam shaft 200 is driven in a manner which will be readily understood without a more detailed description. From the description thus far given, it will be observed that the die spindles and the pointing spindles are driven from the main shaft carrying the driving pulley 20 while the cam shaft with its various cams for operating the several levers, etc. is driven from the driving pulley 54 through the medium of the transverse worm shaft 47, and the change gears 52 just described. These gears 52 are enclosed in a suitable casing 60 having a suitable cover 61 (see Figs. 2 and 5).

Bolted to both sides of the bed 1 near the top of the same are two rectangular side bars or arms 62 (see Figs. 1 and 2). Bolted to and between these two side bars at a suitable distance from the end of the bed 1, is a cam shaft supporting bracket 63 having a lower extending portion for supporting the extreme end of the cam shaft 200. Suitable means is provided for taking up the lengthwise play of the cam shaft 200, and this means comprises in the present instance, a housing bracket or socket 64 bolted to the bracket 63. Inside each of these sockets is a recess for the reception of a hardened plate, in engagement with which and carried by the socket is a set screw 65, and between the hardened plate and the end of the cam shaft is located a ball so that by adjusting the set screw 65, the lengthwise play of the cam shaft will be quickly taken up in a manner which will be readily understood, since there is a similar adjusting means carried by the bed at the opposite end of the cam shaft, so that when the set screws are properly adjusted, the adjustment of the cam shaft will be maintained. A further detailed description of this adjusting means is not deemed necessary, since it is clearly shown and described in the National Acme Company Patent No. 1,318,116 dated October 7, 1919 (see Fig. 2).

The worm wheel 50 may be secured to the cam shaft 200 by suitable safety mechanism, such as that shown and described in Patent No. 1,318,116 dated October 7, 1919 (see Fig. 6) or Patent No. 1,320,609 dated November 4, 1919 (see Fig. 12), both owned by The National Acme Company.

The construction of the duplex turret is as follows, but as the construction of each blank carrier 6 and 6' is the same, a description of one will therefore be deemed sufficient, and as these blank carriers are duplicated, the reference characters applied to both will be duplicates, except that the prime mark will be used in connection with one set of these reference characters:

Milled in the face of each of these blank carriers at an equal distance apart are eight suitably tongued recesses 77, the tongued recesses 77' of the blank carrier 6' being opposed to those of the recesses 77 of the blank carrier 6. In each of these tongued recesses is located a pair of flanged gripping blocks 78 and 79$^a$ (see Figs. 17 and 18), the flanges of the blocks forming guides for maintaining the blocks in position in the tongued recesses. The block 79$^a$ is firmly fastened against movement while the block 78 is mounted to slide toward and from the block 79$^a$. At the outer end of sliding block 78 is located an adjusting screw and lock nut 80$^a$. The opposed ends of these gripping blocks 78 and 79$^a$ are machined to conform to the diameter of the work or stock that is to be operated upon, and into the inner or opposing ends of each of these gripping blocks is milled a slot, in each of which is pivotally hung tension plates or jaws 81 and 82, and in suitable bores of these blocks are housed compression springs 83 and 84, which press these jaws toward each other. For each of the shiftable blocks 78 there is provided a spring 85 located in a portion of the tongued slot of the blank carrier, one end of this spring 85 engaging a wall of the blank carrier while the other end impinges against a pin 86 carried by the sliding block 78, and which pin moves in a portion of the tongued slot of the blank carrier.

In line with the machined ends of the opposed gripping blocks is a bore extending through the blank carrier or disk, which is large enough to be suitably bushed with bushings 87 and 87' (see Fig. 19) and these bushings extend through the blank carriers or disks and the webs connecting the same (see Fig. 15) and have a bore of approximately the diameter of the blanks to be operated upon. These bushings of course are secured firmly in place. Suitably bolted to each side of the bed 1 are two extended bracket bearings 90 and 90' and into each of these four bearings in a suitable bore thereof is located a gripping block operating plunger 91 and 91', it being understood that there are two of these at each side of the machine (see Fig. 14). In other words, there are two duplicate plungers at one side of the machine to cooperate with the blank gripping blocks during the time that the blanks are being pointed, and there are two similar plungers at the opposite side of the machine to cooperate with the blank gripping blocks during the time that the two blanks are being threaded, and a description of one will therefore be deemed sufficient for all four. One end of each of these plungers 91 projects beyond its bearing in position to contact with the adjusting screws 80ᵃ of the sliding gripping block 78 after the indexing of the turret at the proper time. The other end of this plunger comprises a cup-shaped portion 92 sliding in its bearing and an extended stem or spindle 93 on which is located a compression spring 94 and on this spindle is loosely mounted a similar cup-shaped portion 95, and between which cup-shaped portions the spring is mounted and housed. To each of the bearing brackets 90 and 90' is pivotally secured a lever 96, to the lower ends of which are fastened suitable studs and rollers to cooperate with suitably mounted cam disks 97 and 97' carried by the cam shaft 200. By means of these cams the levers 96 and 96' are operated at the proper time to shift the plungers, the spindles of which extend through the upper ends of the levers and are secured thereto, so that these plungers will engage the headed screws 80ᵃ of the shiftable gripping blocks and move them inward against the action of the springs 85, so as to properly grip the work or blank, and hold such blank firmly in position to be operated upon, the springs 85 of the sliding gripping block moving the gripping block away from the blank when the plungers are forced back by the compression springs 94.

A bracket 100 (see particularly Figs. 4, 6 and 21) is secured to the bed of the machine in front of the blank carrier 6' at a suitable distance therefrom and to the top face of this bracket is fastened a magazine 101 for the reception of the blanks to be fed to the duplex turret, and the blanks are fed into position to be pushed into the duplex turret by suitable mechanism, a part of which comprises a lever 102 pivotally bolted to a part of the bracket 100, the lower end of which is operated by suitable cams and cam drum 99 carried on the cam shaft 200, and the upper end of which lever 102 is linked to a slide bar or plate 103, which plate is provided with a slot adapted to receive a blank from the mouth of the magazine and feed it into a recess or trough-shaped member or sleeve 104 (see Fig. 7), from which position it is pushed forward by a pusher rod hereinafter described, into the turret. In the present organization it will be observed that the feed rods hereinafter described and the magazine just described are located to cooperate with the blank carrier 6',—in other words they are located at the right hand end of the machine in Fig. 1.

A detailed description of the construction of this magazine and its operation is not deemed necessary herein since it is clearly shown and described in Patent No. 1,315,416 dated September 9, 1919 owned by The National Acme Company. Of course other means for feeding the blank might be used, but the construction described in the patent referred to is deemed the preferable means, since it overcomes many disadvantages of various blank feeding means theretofore used. By means of this blank feeding means, one blank at a time relieved from the pressure of all the blanks in the magazine can be fed into the blank carrier 6' of the duplex turret at the proper time by the means about to be described.

Located in a horizontal position, a suitable distance away from each other and from the end of the bed, are a pair of parallelly located guide bars 105 (see Fig. 6), the inner ends of which are housed in the bed of the machine, while the outer ends are housed in the cam shaft supporting bracket 63. Mounted to slide on these guide bars 105 by means of suitable bearings, is feed rod operating slide 106, and this slide is shifted back and forth on its guide rods 105 by a suitable stud and roller located at the underside of the slide in position to be engaged by suitable cams located on a cam drum 110. On the underside, at each end of the slide 106 are pivoted dogs 107, into the end of each of which is fastened a feed lever operating rod 108 (see Fig. 9). The other ends of these rods pass through suitable bores in the feed operating levers 109, and are held in connection therewith by suitable collars. The two levers 109 are pivotally bolted at their lower ends to brackets 111 secured to the bed bars 62. The upper ends of these levers 109 are provided with laterally extending studs and dogs 112 (see Fig. 9) adapted to project into the grooved portions of feed rod spools 113 carried by the blank feed rods about to be described. Bolted to the upper face of the cam shaft supporting bracket 63 is a rearwardly curved bracket 114 and in the upper end of this bracket the two feed rods for the blanks 115 and 116 are housed for sliding movement. These feed rods are also supported adjacent to their forward ends by other suitable brackets 117.

Springs 118 in conjuction with suitable collars 119 located on these feed rods act as cushions or buffers to eliminate a positive thrust when feeding the springs being located between the grooved spools and the collars positioned forwardly of the spools, one end of each spring engaging a grooved spool and the opposite end a collar.

From the foregoing, it will therefore be observed that when the cam drum 110 through the medium of the proper cams, shifts the slide 106, the levers 109 will be swung to shift the sliding feed rods 115 and 116 forward and backward. The feed rod 115 will thereupon push the blank dropped from the magazine into position into the blank carrier 6' whereupon on the next indexing of the carrier this blank will be suitably pointed while the feed rod 116 acts to push a blank which has been both pointed and threaded from the blank carrier 6' into the blank carrier 6 in readiness to be carried into position to be pointed and threaded, and also acts to eject this self-same blank after it has been pointed and threaded at its opposite end by reason of the fact that as one blank is pushed from the blank carrier 6' into the blank carrier 6, the blank therein which has been completed is pushed out. Of course the feed rod 116 will be given a greater lengthwise movement in order to carry the blank completely from the blank carrier 6' into the blank carrier 6 to the front of the same to permit it to be operated upon by the pointing and threading tools.

Of course it will be understood that while the details of the cams are not herein particularly illustrated or described, that these cams are constructed and timed to accomplish the various operations of the machine,— in other words, proper cams are used to accomplish the desired work and as these cams are well known and understood, a detailed showing thereof is not deemed necessary. In certain classes of work, it is sometimes desirable to drill a piece of work at right angles to the length thereof. When this is desired, an additional fixture may be used (see Fig. 14), and which is shown in a general way at 125. This fixture may be bolted to the bed of the machine by a suitable bracket in front of either of the blank carriers 6 or 6', according to which end of the stud it is desired to drill. The drill is shown at 126, and may be operated by a belt pulley 127 and the movement of the drill into the work may be obtained by a suitable grooved collar 128, cooperating with which is a cam-operated lever 129 pivoted to the bracket carrying the drill and the lower end of which lever 129 is linked to a lever 130 having a forked end 131 mounted on the cam shaft 200, and carrying a stud and roller 132 cooperating with a suitable cam 133 located on the cam shaft, 200, whereupon as the drill is rotated the rotation of the cam will feed it by the levers just described into the work. This is only a general description of one form of drilling means, and its operating parts, which might be used, since obviously a different operating means could be provided if desired.

Briefly, the operation of this machine is as follows:

A blank from the magazine is pushed forward and fed into that particular pair of grip blocks, the bores of which are in line with the blank. Thereupon the turret is indexed downwardly to the next station, which thus brings the blank in line with the pointing spindle directly underneath the magazine. At this time of course another blank is fed into the next succeeding grip blocks. As the blank is brought into position opposite the pointing spindles, the grip blocks by means of the lever 96', and its cooperating plunger, securely grip the blank so that the pointing tool, when it is carried forward, can properly operate upon the end of the blank. As the pointing tool recedes, the grip lever 96' releases its pressure upon the grip blocks or rather upon the sliding grip block, and thereupon the duplex turret is then indexed downwardly, one station carrying the work blank with it, so that the blank in the succeeding station can be operated upon by the pointing tool in precisely the same way. As the turret is indexed into position with each set of gripping blocks in line with the feed rod 115, a blank of course is fed into the blank carrier 6'. In other words, a repetition of the blank feeding and blank pointing occurs on every index of the duplex turret.

Eventually, this brings the first blank which has been pointed downwardly and around to the opposite side of the machine and in line with the threading die spindle, whereupon it is again gripped by the gripping blocks through the medium of its plunger and lever 96', and as the die spindle is fed forward the stud is properly threaded. The duplex turret is then carried or indexed, one station—that is, upwardly—from the threading die spindle, thus bringing the blank into line with the feed rod 116, which, by means of the mechanism hereinbefore explained, pushes this pointed and threaded stud or blank from the blank carrier 6' into the blank carrier 6 into position to be gripped by a pair of grip blocks in precisely the same manner hereinbefore described. Thereupon, as the duplex turret is indexed through several stations, the blank carrier 6 carries this blank into position in line with the pointing spindle on the opposite side of the machine, at which time the sliding grip block is forced into engagement with the blank by the lever 96, and its plunger, and as the pointing spindle is fed forward the blank is suitably pointed at its opposite end. Thereupon the sliding grip block is released, and as the turret is indexed the blank is eventually carried back again to the opposite side of the machine and into position opposite the other threading die, whereupon it is again effectively gripped and as this threading die is fed forward, it is threaded so that at this time the blank has both ends pointed and both ends threaded. Thereupon upon the next indexing of the turret, the completely pointed and threaded blank is carried to one station above the threading dies and as the feed rod 116 forces a half completed blank from the blank carrier 6′ into the blank carrier 6, this operation forces out or ejects the completely threaded and pointed blank. The spring actuated jaws 81 and 82 of the grip blocks hold the work blanks in their proper positions at those times when the grip levers are not operating upon the grip blocks.

From the foregoing, it will be observed that each blank may have all of its operations performed thereon after it is once placed in the magazine without any handling or reversing of the blank, so that this machine is a radical departure from and a decided improvement upon the machine shown and described in Patent No. 1,315,427 dated September 9, 1919 hereinbefore referred to, inasmuch as that machine can perform but one operation out of a definite four in the manufacture of studs, that is to say, in that machine the blanks must be first placed in the magazine and fed into position to have one end pointed by a suitable pointing tool in place of the threading die there shown. After this end is pointed, the blanks must be then handled again to replace them in the magazine, reversely, so that the opposite end can be fed into position to be pointed. Subsequent to this the blanks must be then rehandled and again placed in the magazine, and a threading die must be substituted for the pointing tool, whereupon one end of the blank is threaded. Subsequent to this the blanks must be again rehandled and reversed to place them in the magazine in position to have the opposite end threaded by the threading tool, this thus requiring two reversals of the blank, three handlings thereof, and the substitution of a threading tool for a pointing tool in order to do the work that is done by this single machine, or else the blanks must be pointed on some other machine in the first place, one end at a time, and then threaded one end at a time on the machine shown in said patent, whereas in the present improved machine all of these four operations are performed upon every index of the turret and in the approximate time that it takes to perform a single operation of either pointing or threading in the patent to which reference has just been made. So that, it will be seen that since the present improved machine will perform four operations while the machine shown in the patent, to which reference has just been made will perform but one in the same space of time, it follows that the output of this improved machine is very materially increased and the cost of such output therewith very materially decreased.

It will be understood that the various details may be more or less changed without departing from the spirit or scope of the present improvement as defined in the claims.

In the diagrammatic view shown in Fig. 13, the loading position of the blank carrier is shown at 1, where it receives its blank from the magazine. The first pointing position is shown at 2. The idle stations are shown at 3, 4 and 5. The first threading position is shown at 6ª, and at 7 the blank is pushed from one blank carrier therethrough into the back of the other blank carrier indicated as at 7′. From thence it passes through several idle positions 8′ and 9′ to the position indicated by 2′, which is exactly opposite the pointing tool indicated at 2, where the opposite end is pointed, and from thence it passes through the positions indicated by 3′, 4′ and 5′ to the position 6ᵇ where its opposite end is threaded and then to the position 7′ where it is ejected.

As the pointing spindles are shown in the present instance as being rotated in the same direction, right and left hand tools will of course be used in connection therewith.

We claim as our invention:

1. In a metal working machine, the combination of a rotatable blank carrying turret, means for indexing it, a pair of end working tools, one at each side of the turret, means for reciprocating said tools toward and from the turret, means at each side of the turret for gripping a blank during the operation of said tools, and means for feeding a blank endwise to one or both gripping means.

2. In a metal working machine, the combination of a rotatable blank carrying turret, means for indexing it, a pair of tools, one operating at each side of the turret, means for feeding blanks into operating position at each side of the turret, and means for reciprocating said tools toward and from the blanks.

3. In a metal working machine, the combination of a rotary blank carrying turret, means for indexing it, a pair of tools, one operating at each side of the turret, means for gripping a blank at each side of the turret, means for feeding blanks to such gripping means, and means for reciprocating said tools toward and from the blanks.

4. In a metal working machine, the combination of a rotary blank carrying turret, means for indexing it, a pair of end working tools, one at each side of the turret, means for reciprocating said tools toward and from the turret, and means for pushing blanks into postion to be operated upon at each side of the turret.

5. In a metal working machine, the combination of a rotary blank carrying turret, means for indexing it, a pair of end working tools, one at each side of the turret, means for reciprocating said tools toward and from the turret, and means for pushing blanks into position to be operated upon at each side of the turret, said tools operating upon opposite ends of the same blank.

6. In a metal working machine, the combination of a pair of blank carriers, each having a plurality of alined blank holding means, means for intermittently indexing them, means for feeding blanks to one of said carriers, means for feeding the blanks from one carrier to the other, an end working tool cooperating with each carrier, and means for shifting said tools toward and from the carrier.

7. In a metal working machine, the combination of a pair of alined blank carriers, means for intermittently indexing them, means for feeding blanks to one of said carriers, means for feeding the blanks from one carrier to the other, an end working tool cooperating with each carrier, and means for shifting said tools toward and from the carrier, said tools being duplicates of each other.

8. In a metal working machine, the combination or a pair of blank carriers, means for intermittently indexing them, means for feeding blanks to one of said carriers, means for feeding the blanks from one carrier to the other, a plurality of end working tools cooperating with each carrier and between which the carriers are located, and means for shifting said tools to and from the carriers.

9. In a metal working machine, the combination of a pair of blank carriers, means for intermittently indexing them, means for feeding blanks to one of said carriers, means for feeding the blanks from one carrier to the other, a plurality of end working tools cooperating with each carrier, the tools for one carrier being alined with those of the others, and means for shifting said tools to and from the carriers.

10. In a metal working machine, the combination of a rotatable blank carrying turret, means for indexing it, a pair of end working tools, means for reciprocating said tools toward and from the turret, and means for feeding a blank into operating position at each side thereof.

11. In a metal working machine, the combination of a rotatable blank carrying turret, means for indexing it, a pair of end working tools, one at each side of the turret, means for reciprocating said tools toward and from the turret, means for feeding a blank to the turret at one side thereof, and means for feeding the blank from one side of the turret to the opposite side thereof to be operated upon.

12. In a metal working machine, the combination of a rotatable blank carrying turret, means for indexing it, a pair of end working tools, one at each side of the turret, means for reciprocating said tools toward and from the turret, means for feeding a blank to the turret at one side thereof, means for feeding the blank from one side of the turret to the opposite side thereof to be operated upon, and means for gripping the blanks in the turret.

13. In a metal working machine, the combination of a rotatable blank carrying turret, means for indexing it, a pair of end working tools, one at each side of the turret, means for reciprocating said tools toward and from the turret, means for feeding a blank to the turret at one side thereof, means for feeding the blank from one side of the turret to the opposite side thereof to be operated upon, means for gripping the blanks in the turret, and means for locking the turret after each indexing thereof.

14. In a metal working machine, the combination of a rotatable blank carrying turret, means for indexing the turret intermittently, means for locking the turret after each indexing thereof, gripping means carried by the turret for gripping a plurality of blanks, means cooperating with said gripping means for effecting the operation thereof, a plurality of end working tools located at each side of the turret, and means for shifting the tools relatively to the turret.

15. In a metal working machine, the combination of a rotatable blank carrying turret, means for indexing the turret intermittently, means for locking the turret after each indexing thereof, gripping means carried by the turret for gripping a plurality of blanks, means cooperating with said gripping means for effecting the operation thereof, a plurality of end working tools located at each side of the turret, means for shifting the tools relatively to the turret, means for feeding a blank to one side of the turret, and means for pushing said blank from one side to the opposite side of the turret into position to be worked upon.

16. In a metal working machine, the combination of a rotatable blank carrying turret, means for indexing the turret intermittently, means for locking the turret after each indexing thereof, gripping means carried by the turret for gripping a plurality of blanks, means cooperating with said gripping means for effecting the operation thereof, a plurality of end working tools located at each side of the turret, means for shifting the tools relatively to the turret, means for feeding a blank to one side of the turret, and means for pushing said blank from one side to the opposite side of the turret into position to be worked upon, the tools at one side of the turret being duplicates of the tools at the opposite side.

17. In a metal working machine, the combination of a rotatable blank carrying turret, means for indexing the turret intermittently, means for locking the turret after each indexing thereof, gripping means carried by the turret for gripping a plurality of blanks, means cooperating with said gripping means for effecting the operation thereof, a plurality of end working tools located at each side of the turret, means for shifting the tools relatively to the turret, means for feeding a blank to one side of the turret, and means for pushing said blank from one side to the opposite side of the turret into position to be worked upon, the tools at one side of the turret being duplicates of the tools at the opposite side, one tool at each side of the turret comprising a stud pointing tool and another a threading tool.

18. In a metal working machine, the combination of a pair of duplicate blank carriers spaced apart, means for intermittently indexing said carriers, duplicate sets of gripping means carried by the carriers, feeding means for successively feeding blanks to one of said carriers, means for feeding the blank from one carrier to the other, a plurality of end working tools located to cooperate with each carrier, certain of the tools thereof being of different forms, and one comprising a pointing tool and the other a threading tool and operative upon the work at the stations of the carriers intermediate the stations at which a blank is fed to one carrier and a blank is fed from one carrier to the other.

19. In a metal working machine, the combination of a pair of duplicate blank carriers spaced apart, means for intermittently indexing said carriers, duplicate sets of gripping means carried by the carriers, feeding means for successively feeding blanks to one of said carriers, means for feeding the blanks from one carrier to the other, a plurality of end working tools located to coperate with each carrier, certain of the tools thereof being of different forms, and one comprising a pointing tool and the other a threading tool and operative upon the work at the stations of the carrier intermediate the stations at which a blank is fed to one carrier and a blank is fed from one carrier to the other, said carriers being supported upon a horizontal axis.

20. In a metal working machine, the combination of a pair of duplicate blank carriers, means for indexing them, a pair of end working tools, one at the side of each carrier, means for reciprocating said tools toward and from the carriers, and means for feeding a blank from one carrier into its companion carrier.

21. In a metal working machine, the combination of a rotatable blank carrying turret, means for indexing it, a pair of end working tools, one at each side of the turret, means for reciprocating said tools toward and from the turret, means for feeding a blank from one part of the turret to another part thereof, and means for gripping the blank at each of said parts of the turret.

22. In a metal working machine, the combination of a rotatable blank carrying turret, means for indexing it, a pair of end working tools, one at each side of the turret, means for reciprocating said tools toward and from the turret, means for feeding a blank from one part of the turret to another part thereof, and gripping means carried by the turret for gripping the blanks during the rotation of the turret.

23. In a metal working machine, the combination of a rotatable blank carrying turret, means for indexing it, a pair of end working tools, one at each side of the turret, means for reciprocating said tools toward and from the turret, means for feeding a blank from one part of the turret to another part thereof, gripping means carried by the turret for gripping the blanks during the rotation of the turret, means for locking the turret after each indexing thereof, and means cooperating with said gripping means for more effectively gripping the blanks at each locking of the turret.

24. In a metal working machine, the combination of a rotatable blank carrying turret, means for indexing it, a tool supporting member, means for actuating said tool member and turret, one relatively to the other, pivoted means for gripping a blank in said turret during the rotation thereof, means for locking said turret after each indexing thereof, and means cooperating with said pivoted means for more effectively gripping a blank while the turret is in its locked position.

25. In a metal working machine the combination of a rotatable blank carrying turret, means for indexing it, a pair of tools, means for reciprocating the tools relatively to the turret, means for feeding a blank into position in the turret to permit the operation of a tool at one end of the blank and means for feeding said blank into position in the turret to permit the operation of a tool at the opposite end of the blank.

26. In a metal working machine the combination of a rotatable blank carrying turret, means for indexing it, a pair of tools, means for reciprocating the tools relatively to the turret, means for feeding a blank into position at one side of the turret to permit the operation of a tool at one end of the blank, and means for feeding said blank endwise into position at the opposite side of the turret to permit the operation of a tool at the opposite end of the blank.

27. In a metal working machine, the combination of a pair of blank carriers, means for indexing the carriers, means for feeding a blank endwise from one carrier into its companion carrier, and means for working upon the blanks in the carriers and comprising duplicate sets of tools, one set located opposed to those of the other set.

28. In a metal working machine, the combination of a pair of blank carriers, means for indexing the carriers, means for feeding a blank endwise from one carrier into its companion carrier, means for working upon the blanks in the carriers, and means for gripping the blanks in the carriers and effective to grip the blanks with different degrees of efficiency at different positions of the carrier.

29. In a metal working machine, the combination of a rotary turret having means for holding blanks at opposite sides thereof, a plurality of end working tools cooperating with the opposite sides of the turret, means for indexing the turret, means for actuating the tools relatively to the turret, and means for feeding a blank into positions to be operated upon by each tool.

30. In a metal working machine, the combination of a rotary turret, a pair of tools cooperating one with each face of the turret, means for indexing the turret, means for actuating the tools relatively to the turret, said turret having means for gripping one end of a blank while the opposite end is operated upon and means for subsequently gripping said last end of the blank while said first end is operated upon, and means for shifting the blank to permit operation of said gripping means.

31. In a metal working machine, the combination of a duplex rotary turret having means at opposite faces thereof for holding blanks, means for feeding blanks to said means, opposed sets of end working tools cooperating with opposite faces of the turret and between which the turret is supported for rotary movement in a vertical plane, means for intermittently rotating the turret, and means for actuating the tools.

32. In a metal working machine, the combination of a duplex rotary turret, opposed sets of end working tools cooperating with opposite faces of the turret and between which the turret is supported for rotary movement in a vertical plane, means for intermittently rotating the turret, means for actuating the tools, said turret having means for gripping one end of a blank while the opposite end is operated upon and means for subsequently gripping said last end of the blank while said first end is operated upon, and means for shifting the blank to permit operation of said gripping means.

33. In a metal working machine, the combination of a pair of blank carriers, means for indexing them, a pair of tools adapted to operate at opposed sides of said carriers, means for actuating the tools, means for feeding a blank to one carrier, and means for feeding a blank from one carrier to the other carrier, one of said means operating to eject a blank from a carrier.

34. In a metal working machine, the combination of a pair of blank carriers, means for intermittently indexing them in unison, alined gripping means carried by the carriers, means for operating the gripping means, means for locking the carriers, a pair of tool spindles at each side of the machine and cooperating with each blank carrier, means for reciprocating said tool spindles, and means for feeding a blank from one gripping means to another.

35. In a metal working machine, the combination of a rotatable blank carrying turret, means for rotating it, a pair of tools adapted to operate at each side of said turret, means for actuating the tools, means for feeding a blank to one side of the turret, and means for feeding a blank to the opposite side of the turret, one of said means operating to eject a finished blank from the turret.

36. In a metal working machine, the combination of a pair of blank carriers, means for intermittently indexing them in unison, means for locking the carriers, means for feeding a blank to one carrier at one side of the machine, means for feeding said blank from said carrier to the other carrier at the opposite side of the machine, and means for working upon the blanks.

37. In a metal working machine, the combination of a pair of blank carriers, means for intermittently indexing them in unison, a plurality of sets of gripping means carried by each carrier, means for actuating said gripping means, means for locking the carriers, a pair of opposed tool spindles at each side of the machine, a pair thereof cooperating with each blank carrier and located in parallelism, means for simultaneously reciprocating all of said tool spindles, and means for feeding a blank into positions to be operated upon by the tool in each spindle.

38. In a metal working machine, the combination of a pair of blank carriers, means for intermittently indexing them in unison, means for locking the carriers, means for feeding a blank to one carrier at one side of the machine, means for feeding said blank from said carrier to the other carrier at the opposite side of the machine, and means for working upon the blanks and comprising a pair of tools, one cooperating with each carrier for working upon a pair of blanks at one side of the machine.

39. In a metal working machine, the combination of a pair of blank carriers, means for intermittently indexing them in unison, means for locking the carriers, means for feeding a blank to one carrier at one side of the machine, means for feeding said blank from said carrier to the other carrier at the opposite side of the machine, means for working upon the blanks and comprising a pair of tools, one cooperating with each carrier for working upon a pair of blanks at one side of the machine, and a pair of tools, one also cooperating with each carrier for working upon a pair of blanks at the opposite side of the machine.

40. In a metal working machine, the combination of a pair of blank carriers, means for intermittently indexing them in unison, means for locking the carriers, means for feeding a blank to one carrier at one side of the machine, means for feeding said blank from said carrier to the other carrier at the opposite side of the machine, means for working upon the blanks and comprising a pair of tools, one cooperating with each carrier for working upon a pair of blanks at one side of the machine, and a pair of tools, one also cooperating with each carrier for working upon a pair of blanks at the opposite side of the machine, the tools of each pair being duplicates.

41. In a metal working machine, the combination of a pair of blank carriers, means for intermittently indexing them in unison, means for locking the carriers, means for feeding a blank to one carrier at one side of the machine, means for feeding said blank from said carrier to the other carrier at the opposite side of the machine, means for working upon the blanks and comprising a pair of tools, one cooperating with each carrier for working upon a pair of blanks at one side of the machine, and a pair of tools, one also cooperating with each carrier for working upon a pair of blanks at the opposite side of the machine, the tools of each pair being duplicates, the tools of one pair comprising stud pointing tools and the tools of the other pair comprising threading tools.

42. In a metal working machine, the combination of a pair of blank carriers, means for intermittently indexing them in unison, means for locking the carriers, means for feeding a blank to one carrier at one side of the machine, means for feeding said blank from said carrier to the other carrier at the opposite side of the machine, means for working upon the blanks, a plurality of sets of gripping means carried by each carrier, and means for operating the same.

43. In a metal working machine, the combination of a pair of blank carriers, means for intermittently indexing them in unison, means for locking the carriers, means for feeding a blank to one carrier at one side of the machine, means for feeding said blank from said carrier to the other carrier at the opposite side of the machine, means for working upon the blanks and comprising a pair of tools, one cooperating with each carrier for working upon a pair of blanks at one side of the machine, a pair of tools, one also cooperating with each carrier for working upon a pair of blanks at the opposite side of the machine, a plurality of sets of gripping means carried by each carrier, and means for operating the same.

44. In a metal working machine, the combination of a pair of blank carriers, means for intermittently indexing them in unison, means for locking the carriers, means for feeding a blank to one carrier at one side of the machine, means for feeding said blank from said carrier to the other carrier at the opposite side of the machine, means for working upon the blanks, a plurality of sets of spring-controlled gripping means carried by each carrier, and means for positively effecting the operation thereof.

45. In a metal working machine, the combination of a pair of blank carriers, means for intermittently indexing them in unison, means for locking the carriers, means for feeding a blank to one carrier at one side of the machine, means for feeding said blank from said carrier to the other carrier at the opposite side of the machine, means for working upon the blanks and comprising a pair of tools, one cooperating with each carrier for working upon a pair of blanks at one side of the machine, a pair of tools, one also cooperating with each carrier for working upon a pair of blanks at the opposite side of the machine, a plurality of sets of spring-controlled gripping means carried by each carrier, and means for positively effecting the operation thereof.

46. In a metal working machine, the combination of a pair of blank carriers, means for intermittently indexing them in unison, means for locking the carriers, means for feeding a blank to one carrier at one side of the machine, means for feeding said blank from said carrier to the other carrier at the opposite side of the machine, means for working upon the blank, a plurality of sets of gripping means carried by each carrier, spring actuated jaws carried thereby, and means for positively operating said gripping means.

47. In a metal working machine, the combination of a pair of blank carriers, means for intermittently indexing them in unison, means for locking the carriers, means for feeding a blank to one carrier at one side of the machine, means for feeding said blank from said carrier to the other carrier at the opposite side of the machine, means for working upon the blanks and comprising a pair of tools, one cooperating with each carrier for working upon a pair of blanks at one side of the machine, a pair of tools, one also cooperating with each carrier for working upon a pair of blanks at the opposite side of the machine, a plurality of sets of gripping means carried by each carrier, spring actuated jaws carried by said gripping means, and means for positively operating the gripping means.

48. In a metal working machine, the combination of a pair of blank carriers, means for intermittently indexing them in unison, means for locking the carriers, means for feeding a blank to one carrier at one side of the machine, means for feeding said blank from said carrier to the other carrier at the opposite side of the machine, means for working upon the blanks, and a side working tool in position to operate upon the work.

49. In a metal working machine, the combination of a pair of blank carriers, means for intermittently indexing them in unison, means for locking the carriers, means for feeding a blank to one carrier at one side of the machine, means for feeding said blank from said carrier to the other carrier at the opposite side of the machine, means for working upon the blanks and comprising a pair of tools, one cooperating with each carrier for working upon a pair of blanks at one side of the machine, a pair of tools, one also cooperating with each carrier for working upon a pair of blanks at the opposite side of the machine, and a side working tool in position to operate upon the work.

50. In a metal working machine, the combination of a pair of blank carriers, means for intermittently indexing them in unison, means for locking the carriers, means for feeding a blank to one carrier at one side of the machine, means for feeding said blank from said carrier to the other carrier at the opposite side of the machine, means for working upon the blanks, a side working tool in position to operate upon the work, and gripping means carried by each carrier for holding the blanks.

51. In a metal working machine, the combination of a pair of blank carriers, means for intermittently indexing them in unison, means for locking the carriers, means for feeding a blank to one carrier at one side of the machine, means for feeding said blank from said carrier to the other carrier at the opposite side of the machine, means for working upon the blanks and comprising a pair of tools, one cooperating with each carrier for working upon a pair of blanks at one side of the machine, a pair of tools, one also cooperating with each carrier for working upon a pair of blanks at the opposite side of the machine, a side working tool in position to operate upon the work, gripping means carried by each carrier for holding the blanks, and means for actuating said gripping means, one part of said gripping means being effective to hold the blanks during the indexing of the carriers and another part thereof effective to grip the blanks when the carriers are locked.

52. In a metal working machine, the combination of a pair of blank carriers, means for intermittently indexing them in unison, means for locking the carriers, means for feeding a blank to one carrier at one side of the machine, means for feeding said blank from said carrier to the other carrier at the opposite side of the machine, means for working upon the blanks and comprising a pair of tools, one cooperating with each carrier for working upon a pair of blanks at one side of the machine, a pair of tools, one also cooperating with each carrier for working upon a pair of blanks at the opposite side of the machine, a side working tool in position to operate upon the work, gripping means carried by each carrier for holding the blanks, and means for actuating said gripping means, one part of said gripping means being effective to hold the blanks during the indexing of the carriers and another part thereof effective to grip the blanks when the carriers are locked, one part of said gripping means being also effective to hold the blanks during the operation of the side working tool.

53. In a metal working machine, the combination of a pair of duplicate blank carriers, gripping means carried thereby, means for locking the carriers, means for feeding a blank to one carrier, means for feeding a blank from said carrier to the other carrier, a cam shaft, means carried thereby for intermittently indexing the carriers, operating the gripping means, actuating the locking means, and operating said feeding means, means for rotating said cam shaft, and means for working upon the blanks carried by said carriers.

54. In a metal working machine, the combination of a pair of duplicate blank carriers, gripping means carried thereby, means for locking the carriers, means for feeding a blank to one carrier, means for feeding a blank from said carrier to the other carrier and for ejecting it from the latter carrier, a cam shaft, means carried thereby for intermittently indexing the carriers, operating the grpping means, actuating the locking means, and operating said feeding means, means for rotating said cam shaft, and means for working upon the blanks carried by said carriers.

55. In a metal working machine, the combination of a pair of duplicate blank carriers, gripping means carried thereby, means for locking the carriers, means for feeding a blank to one carrier, means for feeding a blank from said carrier to the other carrier, a cam shaft, means carried thereby for intermittently indexing the carriers, operating the gripping means, actuating the locking means, and operating said feeding means, means for rotating said cam shaft, means for working upon the blanks carried by said carriers and comprising two pairs of tool spindles, the spindles of each pair being opposed to each other, means operated from the cam shaft for reciprocating said spindles, and means for rotating all of the spindles simultaneously.

56. In a metal working machine, the combination of a pair of duplicate blank carriers, gripping means carried thereby, means for locking the carriers, means for feeding a blank to one carrier, means for feeding a blank from said carrier to the other carrier, a cam shaft, means carried thereby for intermittently indexing the carriers, operating the gripping means, actuating the locking means, and operating said feeding means, means for rotating said cam shaft, means for working upon the blanks carried by said carriers and comprising two pairs of tool spindles, the spindles of each pair being opposed to each other, means operated from the cam shaft for reciprocating said spindles, and means for rotating all of the spindles simultaneously all in the same direction.

57. In a metal working machine, the combination of a pair of duplicate blank carriers, gripping means carried thereby, means for locking the carriers, means for feeding a blank to one carrier, means for feeding a blank from said carrier to the other carrier, a cam shaft, means carried thereby for intermittently indexing the carriers, operating the gripping means, actuating the locking means, and operating said feeding means, means for rotating said cam shaft, means for working upon the blanks carried by said carriers and comprising two pairs of tool spindles, the spindles of each pair being opposed to each other, means operated from the cam shaft for reciprocating said spindles, means for rotating all of the spindles simultaneously all in the same direction, and means for varying the speed of one set of spindles.

58. In a metal working machine, the combination of a pair of duplicate blank carriers, gripping means carried thereby, means for locking the carriers, means for feeding a blank to one carrier, means for feeding a blank from said carrier to the other carrier, a cam shaft, means carried thereby for intermittently indexing the carriers, operating the gripping means, actuating the locking means, and operating said feeding means, means for rotating said cam shaft, means for varying the speed of said cam shaft, and means for working upon the blanks carried by said carriers.

59. In a metal working machine, the combination of a pair of duplicate blank carriers, a plurality of sets of blank gripping means carried thereby, means for locking the carriers, means for feeding a blank to one carrier, means for feeding said blank endwise from one carrier to the other carrier, a rotary cam shaft, means carried thereby for indexing the carriers, operating the gripping means, actuating the locking means, and operating said feeding means, a worm shaft mechanism for rotating said cam shaft, means for changing the speed of said worm shaft mechanism and thereby the speed of the cam shaft, two pairs of tool spindles, a pair thereof at each side of the machine and located opposed to each other, means for rotating all of the spindles simultaneously in the same direction, and means for varying the speed of one pair of said spindles.

60. In a metal working machine, the combination of a pair of duplicate blank carriers, gripping means carried thereby, means for locking the carirers, means for feeding a blank to one carrier, means for feeding a blank from said carrier to the other carrier, a cam shaft, means carried thereby for intermittently indexing the carriers, operating the gripping means, actuating the locking means, and operating said feeding means, said last feeding means also being effective to eject a completed blank from said last carrier, means for rotating said cam shaft, and means for working upon the blanks carried by said carriers.

61. In a metal working machine, the combination of a pair of duplicate blank carriers, gripping means carried thereby, means for locking the carriers, means for feeding a blank to one carrier, means for feeding a blank from said carrier to the other carrier, a cam shaft, means carried thereby for intermittently indexing the carriers, operating the gripping means, actuating the locking means, and operating said feeding means, said last feeding means also being effective to eject a completed blank from said last carrier through the medium of a partly completed blank, means for rotating said cam shaft, and means for working upon the blanks carried by said carriers.

62. In a metal working machine, the combintion of a pair of rotary blank carriers, means for intermittently indexing them, means for feeding blanks to one of said carriers, means for feeding the blanks from one carrier to the other, an end working tool cooperating with each carrier, and means for shifting said tools toward and from the carrier, said last feeding means also being effective to eject a completed blank from said last carrier.

63. In a metal working machine, the combination of a pair of rotary blank carriers, means for intermittently indexing them, means for feeding blanks to one of said carriers, means for feeding the blanks from one carrier to the other, an end working tool cooperating with each carrier, and means for shifting said tools toward and from the carrier, said last feeding means also being effective to eject a completed blank from said last carrier through the medium of a partly completed blank.

64. In a metal working machine, the combination of a rotary blank carrier, means for rotating it, a plurality of sets of gripping blocks carried by said carrier, each set comprising a fixed block and a sliding block, spring actuated gripping jaws carried by said blocks, a cam shaft, and means operated thereby for shifting the sliding gripping blocks relatively to the fixed blocks.

65. In a metal working machine, the combination of a rotary blank carrier, means for rotating it, a plurality of sets of gripping blocks carried by said carrier, each set comprising a fixed block and a sliding block, spring actuated gripping jaws carried by said blocks, a cam shaft, and means operated thereby for shifting the sliding gripping blocks relatively to the fixed blocks and including a spring cushioned plunger.

66. In a metal working machine, the combination of a rotary blank carrier, means for rotating it, a plurality of sets of gripping blocks carried by said carrier, each set comprising a fixed block and a sliding block, spring actuated gripping jaws carried by said blocks, a cam shaft, means operated thereby for shifting the sliding gripping blocks relatively to the fixed blocks, and adjustable means carried by and for regulating the movement of each sliding block.

67. In a metal working machine, the combination of a pair of horizontally supported rotary blank carriers, a cam shaft, means carried thereby for intermittently indexing the carriers in unison, means operated by the cam shaft for locking said carriers intermediate the indexing thereof, gripping means carried by each of said carriers, two pairs of grip operating means actuated by the cam shaft, one pair at each side of the machine and one of each pair cooperating with a carrier, means located at one side of the machine for feeding a blank to one carrier, means located at the opposite side of the machine for feeding the blank from said carrier to its companion carrier, and means for operating upon the blanks carried by said carriers.

68. In a metal working machine, the combination of a pair of horizontally supported rotary blank carriers, a cam shaft, means carried thereby for intermittently indexing the carriers in unison, means operated by the cam shaft for locking said carriers intermediate the indexing thereof, gripping means carried by each of said carriers, two pairs of grip operating means actuated by the cam shaft, one pair at each side of the machine and one of each pair cooperating with a carrier, means located at one side of the machine for feeding a blank to one carrier, means located at the opposite side of the machine for feeding the blank from said carrier to its companion carrier, means for operating upon the blanks carried by said carriers and comprising a pair of opposed tool spindles at each side of the machine, means for rotating said spindles, and means for reciprocating said spindles toward and from the carriers.

69. In a metal working machine, the combination of a pair of horizontally supported rotary blank carriers, a cam shaft, means carried thereby for intermittently indexing the carriers in unison, means operated by the cam shaft for locking said carriers intermediate the indexing thereof, gripping means carried by each of said carriers, two pairs of grip operating means actuated by the cam shaft, one pair at each side of the machine and one of each pair cooperating with a carrier, means located at one side of the machine for feeding a blank to one carrier, means located at the opposite side of the machine for feeding the blank from said carrier to its companion carrier, means for operating upon the blanks carried by said carriers and comprising a pair of opposed tool spindles at each side of the machine, means for rotating said spindles, means for reciprocating said spindles toward and from the carriers, and means for changing the speed of one set of said spindles.

70. In a metal working machine, the combination of a pair of horizontally supported rotary blank carriers, a cam shaft, means carried thereby for intermittently indexing the carriers in unison, means operated by the cam shaft for locking said carriers intermediate the indexing thereof, gripping means carried by each of said carriers, two pairs of grip operating means actuated by the cam shaft, one pair at each side of the machine and one of each pair cooperating with a carrier, means located at one side of the machine for feeding a blank to one carrier, means located at the opposite side of the machine for feeding the blank from said carrier to its companion carrier, means for operating upon the blanks carried by said carriers and comprising a pair of opposed tool spindles at each side of the machine, means for rotating said spindles, means for reciprocating said spindles toward and from the carriers, means for changing the speed of one set of said spindles, and means for changing the speed of the cam shaft.

71. In a metal working machine, the combination of a pair of horizontally supported rotary blank carriers, a cam shaft, means operated by the cam shaft for intermittently indexing said carriers, a plurality of gripping means carried by each of the carriers, a grip operating means actuated by the cam shaft for each of the carriers, a pair thereof at each side of the machine, those cooperating with each carrier being located in opposed alinement with each other, means for locking the carriers when the gripping means thereof are in alinement with said grip actuating means, a plurality of pairs of work spindles, each pair being located opposed to each other at one side of the machine, means for rotating said spindles simultaneously in the same direction, means for simultaneously reciprocating all of said spindles toward and from the blank carriers, means for feeding a blank to one carrier, and means for feeding said blank from said carrier to the other carrier whereby at least four blanks in the two carriers will be operated upon simultaneously.

72. In a metal working machine, the combination of a duplex blank turret, a cam shaft, a magazine, means operated from said cam shaft for feeding blanks into position to be fed to the turret, means operated from said cam shaft and comprising a push rod for feeding a blank from the magazine to one part of said turret, means operated from said cam shaft and comprising a push rod for feeding said blank from one part of said turret endwise to another part thereof, means operated from the cam shaft for indexing the turret intermittently, means operated from said cam shaft for intermittently locking said turret, means operated from said cam shaft for gripping the blanks in the turret, a pair of reciprocating tool spindles at each side of the turret, a pair thereof located opposed to each other at each side of the machine and adapted to carry duplicate tools, means operated from the cam shaft for reciprocating said spindles, and means for rotating said spindles simultaneously all in the same direction.

73. In a metal working machine, the combination of a pair of duplicate blank carriers, means for intermittently indexing them, a plurality of blank gripping means carried by each of the carriers, a pair of duplicate gripping actuating means for each of the carriers, a pair of duplicate tool spindles adapted to cooperate with the duplicate carriers, another pair of duplicate tool spindles also adapted to cooperate with each of the carriers, and means for actuating said tool spindles whereby a number of blanks will be operated upon simultaneously.

74. In a metal working machine, the combination of a pair of duplicate blank carriers, means for intermittently indexing them, a plurality of blank gripping means carried by each of the carriers, a pair of duplicate grip actuating means for each of the carriers, a pair of duplicate tool spindles adapted to cooperate with the duplicate carriers, another pair of duplicate tool spindles also adapted to cooperate with each of the carriers, means for actuating said tool spindles whereby a number of blanks will be operated upon simultaneously and comprising means for reciprocating all of said tool spindles simultaneously to and from the carriers, and means for rotating all of said tool spindles simultaneously.

75. In a metal working machine, the combination of a pair of duplicate blank carriers, means for intermittently indexing them, a plurality of blank gripping means carried by each of the carriers, a pair of duplicate grip actuating means for each of the carriers, a pair of duplicate tool spindles adapted to cooperate with the duplicate carriers, another pair of duplicate tool spindles also adapted to cooperate with each of the carriers, means for actuating said tool spindles whereby a number of blanks will be operated upon simultaneously and comprising means for reciprocating all of said tool spindles simultaneously to and from the carriers, and means for rotating all of said tool spindles simultaneously all in the same direction.

76. In a metal working machine, the combination of a pair of duplicate blank carriers, means for intermittently indexing them, a plurality of blank gripping means carried by each of the carriers, a pair of duplicate gripping actuating means for each of the carriers, a pair of duplicate tool spindles adapted to cooperate with the duplicate carriers, another pair of duplicate tool spindles also adapted to cooperate with each of the carriers, means for actuating said tool spindles whereby a number of blanks will be operated upon simultaneously all in the same direction, means for feeding a blank into one of the carriers, and means for feeding said blank from said carrier to its companion carrier.

77. In a metal working machine, the combination of a pair of rotary blank carriers, a plurality of blank gripping means carried by each of said carriers, a pair of opposed grip operating means for each of said carriers, means for actuating said grip operating means, means for intermittently rotating the carriers, means for intermittently locking the carriers, a plurality of pairs of opposed tool spindles, means for actuating said tool spindles into working position relatively to the carriers, means for rotating said tool spindles, and means for feeding a blank to one of the carriers.

78. In a metal working machine, the combination of a pair of rotary blank carriers, a plurality of blank gripping means carried by each of said carriers, a pair of opposed grip operating means for each of said carriers, means for actuating said grip operating means, means for intermittently rotating the carriers, means for intermittently locking the carriers, a plurality of pairs of opposed tool spindles, means for actuating said tool spindles into working position relatively to the carriers, means for rotating said tool spindles, means for feeding a blank to one of the carriers, and means for feeding said blank from said carrier to its companion carrier.

79. In a metal working machine, the combination of a bed, a hollow bearing carried thereby, a tubular shaft located in said bearing, a pair of duplicate blank carriers secured at one end of said tubular shaft, an indexing gear secured to the opposite end of said tubular shaft, a locking disk secured to said gear, means cooperating with said indexing gear for intermittently indexing the blank carriers, means cooperating with said locking disk for intermittently locking said blank carriers, a main driving shaft extending through said tubular shaft, means for feeding a blank to one of said carriers, means for feeding the blank therefrom to its companion carrier, a plurality of tool spindles cooperating with each carrier, means carried by said main driving shaft for rotating said tool spindles, and means for reciprocating said tool spindles.

80. In a metal working machine, the combination of bed, a tubular bearing secured thereto, a tubular shaft located in said bearing, a pair of duplicate blank carriers secured to one end of said shaft, means for indexing said blank carriers and having a part thereof secured to the opposite end of said shaft, means for locking said carriers and also having a part thereof secured adjacent to the opposite end of said shaft, a main driving shaft extending into said tubular shaft, a plurality of pairs of opposed tool spindles cooperating with said blank carriers, means carried by said main driving shaft for rotating said spindles, and means for reciprocating said tool spindles toward and from the blank carriers.

81. In a metal working machine, the combination of a bed, a tubular bearing secured thereto, a tubular shaft located in said bearing, a pair of duplicate blank carriers secured to one end of said shaft, means for indexing said blank carriers and having a part thereof secured to the opposite end of said shaft, means for locking said carriers and also having a part thereof secured adjacent to the opposite end of said shaft, a main driving shaft extending into said tubular shaft, a plurality of pairs of opposed tool spindles cooperating with said blank carriers, means carried by said main driving shaft for rotating said spindles, means for reciprocating said tool spindles toward and from the blank carriers, means for feeding blanks to one of said carriers, and means for pushing said blanks successively from said carrier into its companion carrier.

82. In a metal working machine, the combination of a bed, a tubular bearing secured thereto, a tubular shaft located in said bearing, a pair of duplicate blank carriers secured to one end of said shaft, means for indexing said blank carriers and having a part thereof secured to the opposite end of said shaft, means for locking said carriers and also having a part thereof secured adjacent to the opposite end of said shaft, a main driving shaft extending into said tubular shaft, a plurality of pairs of opposed tool spindles cooperating with said blank carriers, means carried by said main driving shaft for rotating said spindles, means for reciprocating said tool spindles toward and from the blank carriers, means for feeding blanks to one of said carriers, and means for pushing said blanks successively from said carrier into its companion carrier, said blank feeding and pushing means comprising a pair of parallelly located feed rods.

83. In a metal working machine, the combination of a pair of duplicate blank carriers, means for intermittently indexing them, means for intermittently locking them, a plurality of gripping means carried by each of said carriers, a pair of duplicate grip actuating means for each carrier, a pair of opposed duplicate tool spindles adapted to carry duplicate tools, another pair of opposed duplicate tool spindles adapted to carry duplicate tools different from said first pair of tools, the spindles cooperating with one carrier being located in parallelism and the spindles cooperating with the other carrier likewise being located in parallelism, means for reciprocating all of the tool spindles, means for rotating all of the tool spindles, a pair of parallelly located feed rods, one effective to feed a blank to one carrier and the other effective to feed a blank from said carrier to its companion carrier, and means for reciprocating said feed rods.

84. In a metal working machine, the combination of a main driving shaft, a pair of blank carriers supported for rotation relatively to said driving shaft substantially centrally of the length thereof, means for indexing said carriers intermittently, means for intermittently locking the same, blank gripping means carried by each of the carriers, means for intermittently operating said blank gripping means, means for feeding a blank to one of the carriers, means for feeding said blank from said carrier to its companion carrier, two pairs of opposed alined tool spindles, one of each pair cooperating with a carrier, means for reciprocating said spindles, and means carried by the main driving shaft for rotating said spindles.

85. In a metal working machine, the combination of a main driving shaft, a pair of blank carriers supported for rotation relatively to said driving shaft substantially centrally of the length thereof, means for indexing said carriers intermittently, means for intermittently locking the same, blank gripping means carried by each of the carriers, means for intermittently operating said blank gripping means, means for feeding a blank to one of the carriers, means for feeding said blank from said carrier to its companion carrier, two pairs of opposed alined tool spindles, one of each pair cooperating with a carrier, means for reciprocating said spindles, means carried by the main driving shaft for rotating said spindles, the rotating means for each of one pair of spindles comprising gearing, a slotted sleeve, and a member adapted to slide relatively to said slotted sleeve.

86. In a metal working machine, the combination of a main driving shaft, a pair of blank carriers supported for rotation relatively to said driving shaft substantially centrally of the length thereof, means for indexing said carriers intermittently, means for intermittently locking the same, blank gripping means carried by each of the carriers, means for intermittently operating said blank gripping means, means for feeding a blank to one of the carriers, means for feeding said blank from said carrier to its companion carrier, two pairs of opposed alined tool spindles, one of each pair cooperating with a carrier, means for reciprocating said spindles, means carried by the main driving shaft for rotating said spindles, the rotating means for each of one pair of spindles comprising gearing, a slotted sleeve, and a member adapted to slide relatively to said slotted sleeve and the rotating means for each of the other pair of spindles comprising a pair of gears, one adapted to travel lengthwise relatively to the other.

87. In a metal working machine, the combination of a pair of rotary blank carriers of disk formation supported back to back, means for intermittently indexing said carriers, means for feeding blanks into the face of one of said carriers, means for feeding the blanks from the back of one carrier into the back of the other, and means located in front of the face of each of said carriers for working on the blanks carried by the carrier.

88. In a metal working machine, the combination of a pair of blank carriers of disk formation supported back to back, means for intermittently indexing said carriers, means for feeding blanks into the face of one of said carriers, means for feeding the blanks from the back of one carrier into the back of the other, and duplicate means located in front of the faces of said carriers for working on the blanks thereof.

89. In a metal working machine, the combination of a pair of rotary blank carriers of disk formation supported back to back, means for intermittently indexing said carriers, means for feeding blanks into the face of one of said carriers, means for feeding the blanks from the back of one carrier into the back of the other, duplicate means located in front of the faces of said carriers for working on the blanks thereof and comprising a pair of opposed pointing tool spindles and a pair of opposed threading tool spindles, means for reciprocating said spindles, and means for rotating them.

90. In a metal working machine, the combination of a pair of rotary blank carriers of disk formation supported back to back, means for intermittently indexing said carriers, means for feeding blanks into the face of one of said carriers, means for feeding the blanks from the back of one carrier into the back of the other, means located in front of the face of each of said carriers for working on the blanks carried by the carrier, gripping means carried by each carrier, and means located at the periphery of each carrier for operating said gripping means.

91. In a metal working machine, the combination of a pair of rotary blank carriers of disk formation supported back to back, means for intermittently indexing said carriers, means for feeding blanks into the face of one of said carriers, means for feeding the blanks from the back of one carrier into the back of the other, means located in front of the face of each of said carriers for working on the blanks carried by the carrier, gripping means carried by each carrier, and a pair of opposed grip actuating means located at the periphery of each carrier for operating said gripping means.

92. In a metal working machine, the combination of a pair of blank carriers having a disk formation, means connecting said carriers for movement in unison and comprising connecting webs, means for indexing the carriers intermittently, tool carrying spindles located in front of the face of each of said carriers, means for operating said spindles, means for feeding blanks into the face of one of said carriers, and means for feeding said blanks from one carrier to the other endwise through said connecting webs.

93. In a metal working machine, the combination of a pair of blank carriers having a disk formation, means connecting said carriers for movement in unison and comprising connecting webs, means for indexing the carriers intermittently, tool carrying spindles located in front of the face of each of said carriers, means for operating said spindles, means for feeding blanks into the face of one of said carriers, means for feeding said blanks from one carrier to the other endwise through said connecting webs, gripping means carried by the carriers, and grip actuating means located at the edges of the carriers and cooperating with said gripping means.

94. In a metal working machine, the combination of a pair of disk-formed blank carriers supported for rotation back to back, means for rotating said carriers, gripping means carried by the carriers, each comprising a sliding member having a part projecting beyond the edge of its carrier, grip actuating means located at the edges of the carriers for cooperating with said projecting parts, means for feeding blanks into one carrier at the face thereof, means for feeding said blanks from said carrier into the companion carrier at the back thereof, duplicate sets of tool carrying spindles, each set located in front of the face of a carrier, means for reciprocating said spindles, and means for rotating them.

95. In a metal working machine, the combination of a pair of disk-formed blank carriers supported for rotation back to back, means for rotating said carriers, gripping means carried by the carriers, each comprising a sliding member having a part projecting beyond the edge of its carrier, grip actuating means located at the edges of the carriers for cooperating with said projecting parts, means for feeding blanks into one carrier at the face thereof, means for feeding said blanks from said carrier into the companion carrier at the back thereof, duplicate sets of tool carrying spindles, each set located in front of the face of a carrier, means for reciprocating said spindles, means for rotating them, and means for varying the speed of one set of said spindles relatively to the other.

96. In a metal working machine, the combination of a pair of disk-formed blank carriers supported for rotation back to back, means for indexing said carriers, gripping means carried by the carriers, each comprising a sliding member having a part projecting beyond the edge of its carrier, grip actuating means located at the edges of the carriers for cooperating with said projecting parts, means for feeding blanks into one carrier at the face thereof, means for feeding said blanks from said carrier into the companion carrier at the back thereof, duplicate sets of tool carrying spindles, each set located in front of the face of a carrier, means for reciprocating said spindles, means for rotating them, and means for varying the speed of the indexing means.

97. In a metal working machine, the combination of a rotatable blank carrying turret, means for rotating it, a pair of tools, one for operating at each face of the turret, means for actuating said tools, and a common blank feeding and ejecting means for the turret.

98. In a metal working machine, the combination of a rotatable blank carrying turret having a plurality of pairs of alined gripping means, means for rotating it, a pair of tools, one for operating at each face of the turret, means for actuating said tools, and means for feeding blanks from one gripping means to the other.

99. In a metal working machine, the combination of a rotatable blank carrying turret, means for rotating it, a pair of tools, one being located to operate at each side of the turret, means for feeding blanks into operating position at each side of the turret and means for actuating said tools.

100. In a metal working machine, the combination of a rotary turret constructed to carry blanks at the opposite faces thereof, means for rotating the turret, and means for operating upon the blanks carried at both faces of the turret, and a common blank feeding and ejecting means for the turret.

101. In a metal working machine, the combination of a rotary turret having alined means for simultaneously carrying blanks at the opposite faces thereof, means for simultaneously operating upon the blanks carried by said means at opposite faces of the turret, and means for feeding the blanks to said faces.

102. In a metal working machine, the combination of a rotary turret having a plurality of means for simultaneously gripping blanks at the opposite faces thereof, means for transferring a blank from one means to another, and means for simultaneously operating upon the blanks carried at both faces of the turret.

103. In a metal working machine, the combination of a rotary turret having means for simultaneously carrying blanks at the opposite faces thereof, means for rotating it, two pairs of duplicate means for simultaneously operating upon the blanks carried at both faces of the turret, and means for transferring the blanks from one duplicate means to another.

104. In a metal working machine, the combination of a rotary blank carrying turret, means for rotating it, means for feeding blanks into the turret at one face thereof, means for gripping the blanks, means for feeding blanks to and out of the opposite face thereof, and means for working upon the blanks carried by said turret.

105. In a metal working machine, the combination of a rotary blank carrying turret, means for rotating it, means for feeding blanks into the turret at one face thereof, means for gripping the blanks, means for feeding blanks to and out of the opposite face thereof, and means for working upon the blanks at both faces of the turret.

106. In a metal working machine, the combination of a rotary blank carrying turret, means for rotating it, means for feeding blanks into the turret at one face thereof, means for gripping the blanks, means for feeding blanks to and out of the opposite face thereof, and means for working upon the blanks at both faces of the turret simultaneously.

107. In a metal working machine, the combination of a rotary blank carrying turret, means for rotating it, means for feeding blanks into the turret at one face thereof, a common means for feeding blanks to and out of the opposite face thereof, and means for working upon the blanks carried by said turret.

108. In a metal working machine, the combination of a rotary blank carrying turret, means for rotating it, a pair of means for feeding blanks into the turret at one face thereof, and a common means for feeding blanks to and out of the opposite face thereof.

109. In a metal working machine the combination of a rotatable blank carrying turret, means for rotating it, a pair of tools, means for gripping a blank to permit the operation of a tool on one end of the blank, means for gripping the same blank to permit the operation of a tool on the opposite end of said blank, and means for feeding the blank successively to each gripping means.

Signed at Cleveland, Cuyahoga County, Ohio, this 26th day of January, 1921.

OSCAR A. SMITH.
GEORGE J. LEBER.